(12) United States Patent
Luo et al.

(10) Patent No.: US 11,507,615 B2
(45) Date of Patent: Nov. 22, 2022

(54) METHOD, APPARATUS, ELECTRONIC DEVICE AND COMPUTER READABLE STORAGE MEDIUM FOR IMAGE SEARCHING

(71) Applicant: Samsung Electronics Co., Ltd., Suwon-si (KR)

(72) Inventors: Zhonghua Luo, Beijing (CN); Jiahui Yuan, Beijing (CN); Wei Wen, Beijing (CN); Zuozhou Pan, Beijing (CN); Yuanyang Xue, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 16/775,712

(22) Filed: Jan. 29, 2020

(65) Prior Publication Data

US 2020/0242153 A1 Jul. 30, 2020

(30) Foreign Application Priority Data

Jan. 29, 2019 (CN) .......................... 201910088336.0

(51) Int. Cl.
*G06F 16/00* (2019.01)
*G06F 16/532* (2019.01)
(Continued)

(52) U.S. Cl.
CPC ......... *G06F 16/532* (2019.01); *G06K 9/6215* (2013.01); *G06N 3/0445* (2013.01);
(Continued)

(58) Field of Classification Search
CPC ...... G06F 16/532; G06K 9/46; G06K 9/6215; G06K 9/629; G06K 9/42; G06N 3/08; G06N 3/0454; G06N 3/0445
See application file for complete search history.

(56) References Cited

U.S. PATENT DOCUMENTS 10,685,265 B2 6/2020 Sewak et al.
2016/0104058 A1 4/2016 He et al.
(Continued)

FOREIGN PATENT DOCUMENTS

| KR | 10-1801846 B1 | 11/2017 |
| WO | 2018/086513 A1 | 5/2018 |
| WO | 2019/148315 A1 | 8/2019 |

OTHER PUBLICATIONS

Kim et al, Learned contextual feature reweighting for image geo-localization, 2017 IEEE conference on computer vision and pattern recognition, pp. 3251-3260 (Year: 2017).*

(Continued)

*Primary Examiner* — Nancy Bitar
*Assistant Examiner* — Xiao Liu
(74) *Attorney, Agent, or Firm* — Jefferson IP Law, LLP

(57) ABSTRACT

A method and apparatus for image searching based on artificial intelligent (AI) are provided. The method includes obtaining first feature information by extracting features from an image based on a first neural network, obtaining second feature information corresponding to a target area of a query image by processing the first feature information based on a second neural network and at least two filters having different sizes, and identifying an image corresponding to the query image according to the second feature information.

15 Claims, 22 Drawing Sheets

(51) Int. Cl.
*G06K 9/62* (2022.01)
*G06N 3/08* (2006.01)
*G06N 3/04* (2006.01)
*G06V 10/32* (2022.01)
*G06V 10/40* (2022.01)

(52) U.S. Cl.
CPC ............ *G06N 3/0454* (2013.01); *G06N 3/08* (2013.01); *G06V 10/32* (2022.01); *G06V 10/40* (2022.01)

(56) References Cited

U.S. PATENT DOCUMENTS

| | | |
|---|---|---|
| 2018/0025249 A1 | 1/2018 | Liu et al. |
| 2018/0150740 A1 | 5/2018 | Wang et al. |
| 2018/0165548 A1* | 6/2018 | Wang .................... G06N 3/0454 |
| 2019/0347485 A1 | 11/2019 | Yang et al. |
| 2021/0034905 A1* | 2/2021 | Lee .......................... G06N 3/04 |

OTHER PUBLICATIONS

Lou et al, Multi-scale context attention network for image retrieval, MM'18, Oct. 22-26, pp. 1128-1136 (Year: 2018).*
Ji et al, Salient object detection via multi-scale attention CNN, Neurocomputing 322 (2018) 130-140 (Year: 2018).*
Xiang et al.; Deep-Person: Learning Discriminative Deep Features for Person Re-Identification; Dec. 9, 2017.
Ziwei et al.; DeepFashion: Powering Robust Clothes Recognition and Retrieval with Rich Annotations; published on 2017.
International Search Report dated May 12, 2020, issued in International Patent Application No. PCT/KR2020/001374.
Ayan Kumar Bhunia et al, "A Deep One-Shot Network for Query-based Logo Retrieval", ARXIV, ORG, Cornell University Library, 201 Olin Library Cornell University Ithaca, NY 14853, Nov. 4, 2018, XP081380437.
Extended European Search Report dated Feb. 7, 2022, issued in European Patent Application No. 20747929.6.

* cited by examiner

Type 1
K=3, DF=1

Type 2
K=3, DF=2

Type 3
K=3, DF=4

METHOD, APPARATUS, ELECTRONIC DEVICE AND COMPUTER READABLE STORAGE MEDIUM FOR IMAGE SEARCHING

CROSS-REFERENCE TO RELATED APPLICATION(S)

This application is based on and claims priority under 35 U.S.C. § 119(a) of a Chinese patent application number 201910088336.0, filed on Jan. 29, 2019 in the State Intellectual Property Office of P.R. China, the disclosure of which is incorporated by reference herein in its entirety.

BACKGROUND

1. Field

The disclosure relates to an artificial intelligence (AI) technology. More particularly, the disclosure relates to image searching based on AI.

2. Description of Related Art

An artificial intelligence (AI) system may refer to a computer system that enables machines to become smart by learning and making decisions on their own, compared to an existing rule-based smart system. The AI system may improve its recognition rates and is capable of understanding a user's preferences more accurately through experience. Thus, existing rule-based smart systems are increasingly being replaced by deep learning-based AI systems.

AI technology may include machine learning (deep learning) and element technologies using the machine learning. Machine learning may refer to an algorithmic technique for autonomously classifying/learning features of input data, and element technologies are technologies for simulating functions of a human brain such as cognition and decision-making using machine learning algorithms and include technical fields such as linguistic understanding, visual understanding, reasoning/prediction, knowledge representation, motion control, etc.

Various technical fields to which AI technology may be applied are, for example, as follows. Linguistic understanding may refer to a technology for recognizing human language/characters for application/processing and includes natural language processing, machine translation, a dialog system, question answering, speech recognition/synthesis, etc. Visual understanding may refer to a technology for recognizing and processing an object, in the same way as performed by a human visual system, and includes object recognition, object tracking, image searching, person recognition, scene understanding, spatial understanding, image enhancement, etc. Reasoning/prediction may refer to a technology for judging information and logically inferring and predicting new information and includes knowledge/probability-based interference, optimization prediction, preference-based planning, recommendations, etc. Knowledge representation may refer to a technology for automatically processing information about human experience as knowledge data and includes knowledge construction (data generation/classification), knowledge management (data utilization), etc. Motion control may refer to a technology for controlling autonomous driving of a vehicle and motion of a robot and includes movement control (navigation, collision avoidance, and travelling), manipulation control (action control), etc.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method electronic device for image searching based on AI.

Additional aspects will be set forth in part in the description which follows and, in part, will be apparent from the description, or may be learned by practice of the presented embodiments.

In accordance with an aspect of the disclosure, a method is provided. The method includes obtaining first feature information by extracting features from an image based on a first neural network, obtaining second feature information corresponding to a target area of a query image by processing the first feature information based on a second neural network and at least two filters having different sizes, and identifying an image corresponding to the query image according to the second feature information.

In accordance with another aspect of the disclosure, an electronic device is provided. The electronic device includes a memory for storing instructions, and at least one processor configured to execute the instructions stored in the memory to obtain first feature information by extracting features from an image based on a first neural network, obtain second feature information corresponding to a target area of a query image by processing the first feature information based on a second neural network and at least two filters having different sizes, and identify an image corresponding to the query image according to the second feature information.

In accordance with another aspect of the disclosure, a computer program product is provided. The computer program product includes a non-transitory computer readable recording medium having stored therein a program for performing the method.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
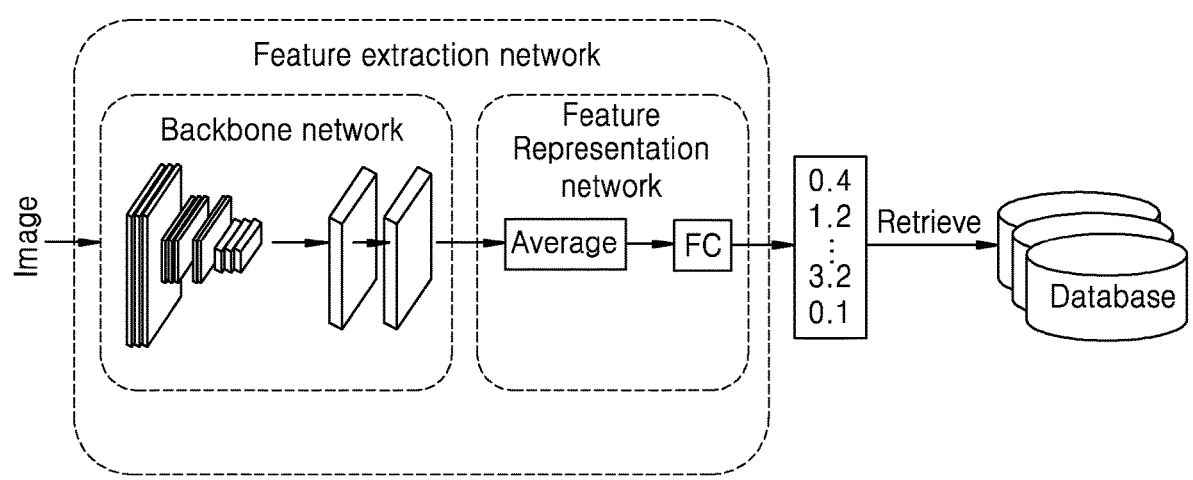
FIG. 1 is a diagram illustrating an example feature extraction process according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the singular forms "a", "an" and "the" are intended to include the plural forms as well, unless the context clearly indicates otherwise. It should be understood that the terms "comprising," "including," and "having" are inclusive and therefore specify the presence of stated features, numbers, steps, operations, components, units, or their combination, but do not preclude the presence or addition of one or more other features, numbers, steps, operations, components, units, or their combination. In particular, numerals are to be understood as examples for the sake of clarity, and are not to be construed as limiting the embodiments by the numbers set forth.

Herein, the terms, such as " . . . unit" or " . . . module" should be understood as a unit in which at least one function or operation is processed and may be embodied as hardware, software, or a combination of hardware and software.

It should be understood that, although the terms "first," "second," etc. may be used herein to describe various elements, and these elements should not be limited by these terms. These terms are used to distinguish one element from another. For example, a first element may be termed a second element within the technical scope of an embodiment of the disclosure.

Expressions, such as "at least one of," when preceding a list of elements, modify the entire list of elements and do not modify the individual elements of the list. For example, the expression "at least one of a, b or c" indicates only a, only b, only c, both a and b, both a and c, both b and c, all of a, b, and c, or variations thereof.

According to embodiments, functions related to artificial intelligence (AI) may operate via a processor and a memory. The processor may include one or more processors. The one or more processors may include a general-purpose processor such as a central processing unit (CPU), an application processor (AP), a digital signal processor (DSP), a dedicated graphics processor such as a graphical processing unit (GPU) or a vision processing unit (VPU), a dedicated AI processor such as a neural processing unit (NPU), or the like, but is not limited thereto. The one or more processors may control input data to be processed according to predefined operation rules or an AI model stored in the memory. When the one or more processors are a dedicated AI processor, the dedicated AI processor may be designed with a hardware structure specialized for processing a specific AI model.

The predefined operation rules or AI model may be created via a training process. The predefined operation rules or AI model may, for example, be set to perform desired characteristics (or purpose) created by training a basic AI model with a learning algorithm that utilizes a large number of training data. The training process may be performed by a device for performing AI or a separate server and/or system. Examples of the learning algorithm may include, without limitation, supervised learning, unsupervised learning, semi-supervised learning, and reinforcement learning, but embodiments of the disclosure are not limited thereto.

The AI model may include a plurality of neural network layers. Each of the neural network layers may have a plurality of weight values and may perform various neural network computations via arithmetic operations on results of calculations in a previous layer and a plurality of weight values in the current layer. A plurality of weights in each of the neural network layers may be optimized by a result of training the AI model. For example, a plurality of weights may be updated to reduce or minimize a loss or cost value acquired by the AI model during a training process. An artificial neural network may include, for example, and without limitation, a deep neural network (DNN) and may include, for example, and without limitation, a convolutional neural network (CNN), a DNN, a recurrent neural network (RNN), a restricted Boltzmann machine (RBM), a deep belief network (DBN), a bidirectional recurrent DNN (BRDNN), deep Q-networks (DQN), or the like, but is not limited thereto.

Hereinafter, various embodiments of the disclosure will be described in greater detail with reference to the accompanying drawings.

In image searching, such as, searching for an image having the same or similar object in an image, because an image database used for searching stores a large amount of image data, in order to accurately and quickly search for images being consistent or similar to a query image in a large amount of image data, feature information representing features of the query image may be extracted from the query image.

FIG. 1 shows a feature extraction process according to an embodiment of the disclosure.

Referring to FIG. 1, a feature extraction network may be divided into two parts, i.e., a backbone network and a feature representation network. The backbone network may be used to extract feature information from the image and output a feature map. The feature representation network may have a two-layer structure. The first layer may calculate an average of feature matrices of each channel in the feature map which is output by the backbone network, thereby obtaining one feature value for each channel. A plurality of channels forms a feature vector which is then fully connected by the full connection (FC) layer of the second layer. The image searching result may be obtained according to the extracted feature information.

A background and an object may not be distinguished in the query image with in the feature representation network of the two-layer structure by the calculation method of averaging the feature matrices. When information of the background is considered to calculate a final feature vector, features of the query image may not be accurately extracted or not described. A feature representation network may also be referred to as a feature processing network.

According to an embodiment, a multi-granularity mining network (MGMN) may be used based on attention mechanism in image searching. In an embodiment, the MGMN may be used in searching for clothing images. The MGMN may employ a deep learning network, and the deep learning network may be used to highlight an area of interest, that is, a target area, in an input image, extract a feature of the target area, ignore (filter, or mask) a background area, obtain and combine information from different granularities, thereby achieving the purpose of more accurate recognition of clothing images.

Figure 2:
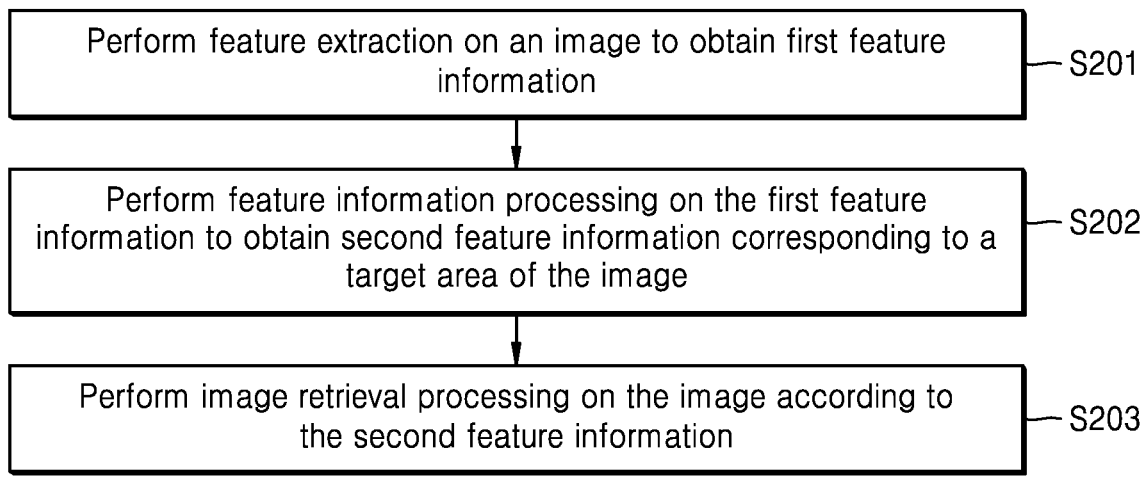
FIG. 2 is a flowchart illustrating an example image searching method according to an embodiment of the disclosure.

FIG. 2 is a flowchart illustrating an example image searching method according to an embodiment of the disclosure.

Referring to FIG. 2, according to an embodiment, the method may include performing feature extraction on a query image to obtain first feature information, performing feature information processing on the first feature information to obtain second feature information corresponding to a target area of the query image, and performing image searching processing on the query image according to the second feature information.

The query image may be referred to as an input image, an image to be processed, an image to be queried, an image to be retrieved, an image to be searched for, and the like herein.

In an embodiment, the feature information processing may also be referred to as feature representation processing. In operation S201, feature extraction may be performed on the query image by a backbone network. In an embodiment, the backbone network may contain multi-layer modules, wherein a bottom layer module may be used to extract basic structure information such as boundaries and intersections, an intermediate module may be used to extract shape information of higher layer, and a high layer module may be used to extract semantic information containing more detailed information, for example, position feature information, or feature position information, etc., but is not limited thereto.

The backbone network may output the first feature information which may be a multi-channel feature map, for example, a 512-channel feature map, and each channel may correspond to a feature matrix, for example, a 7*7 feature matrix, that is, the backbone network may output a 512*7*7 feature map, but is not limited thereto.

In an embodiment, the feature information may be referred to as a feature map, a feature matrix, and a feature vector.

In operation S202, feature information processing may be performed on the first feature information obtained in operation S201 to obtain second feature information corresponding to target area of the query image. The second feature information may be a one-dimensional feature vector. (0.4, 1.2, . . . , 3.2, 0.1) shown in FIG. 1, may be a multi-dimensional feature vector, for example, a 512-dimensional or 1024-dimensional feature vector converted by a 512*7*7 feature map, but is not limited thereto.

In operation S203, image searching processing may be performed on the query image based on the second feature information obtained in operation S202. In operation S203, the second feature information corresponding to the target area of the query image may be matched with feature information of each image in the database to determine an image that matches the query image.

Wherein, in the process of matching the feature information of each image in the database, a cosine distance or a Euclidean distance between the feature information of each image in the database and the feature information of the image may be calculated, and the distance obtained by calculation may be sorted to obtain an image in the database with the smallest distance in the database, that is, an image that best matches the query image.

According to an embodiment, the second feature information corresponding to the target area of the query image may be obtained by performing feature information processing on the first feature information, that is, the feature information of the target area of the query image may be extracted from the first feature information and disordered interference areas may be filtered out or masked out, and image searching may be performed based on the feature of the target area of the query image, thereby improving the accuracy of the searching result.

In an embodiment, S202 may include steps of performing corresponding feature information processing on the first feature information for at least one target area, to obtain a plurality of pieces of third feature information respectively corresponding to target area of the query image; and combining the plurality of pieces of third feature information to obtain the second feature information corresponding to the target area of the image.

In an embodiment, for each target area, the first feature information may be processed by an area processing unit to obtain the plurality of pieces of third feature information corresponding to the target area. The area processing unit may be referred to as an Adaptive Spatial Attention Unit (ASAU). The ASAU may extract multi-scale features from the query image, and, the extracted features may have spatial and channel correlation between each other.

When ASAU processes the first feature information, a convolutional operation may be performed based on the first convolution processing parameter, that is, convolution processing may be performed on the first feature information to obtain the third feature information corresponding to the target area, that is, the third feature information corresponding to the ASAU. The first convolution processing parameter may correspond to a target area of the query image. The third feature information corresponding to the ASAU may contain feature information corresponding to the target area of the image, which is extracted from the first feature information, and disordered interference areas (for example, a background area and the like) are filtered out, such that the image searching may be performed based on the feature information of the target area of the image, thereby improving accuracy of searching results.

Figure 3:
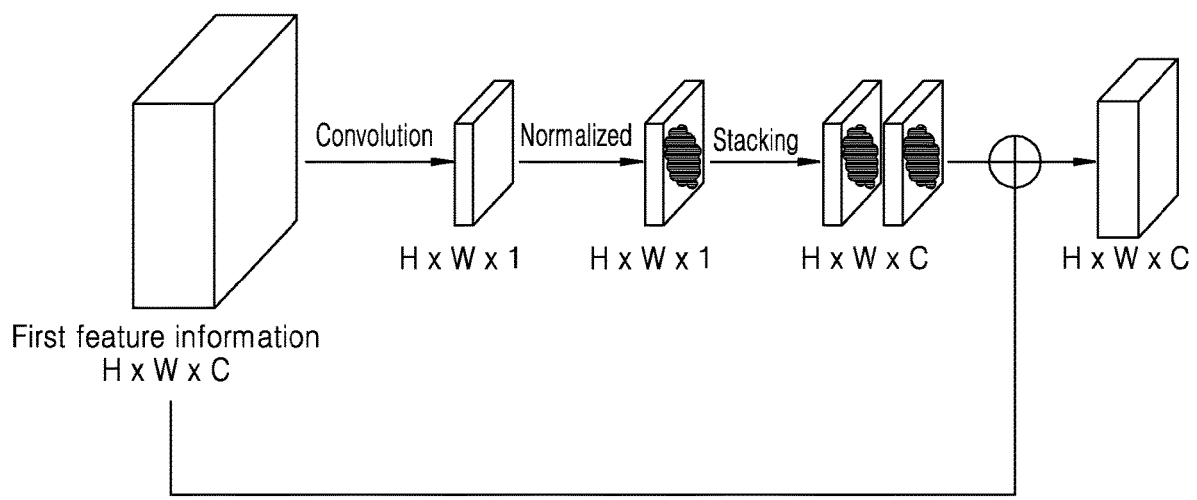
FIG. 3 is a diagram illustrating an example adaptive spatial attention unit (ASAU) structure according to an embodiment of the disclosure.

FIG. 3 is a diagram illustrating an example ASAU structure according to an embodiment of the disclosure.

Referring to FIG. 3, according to an embodiment, an ASAU structure may contain a processing manner in spatial scale, that is, a convolution operation. The first feature information may be convoluted by the first convolution processing parameter obtained by learning, to obtain the feature information highlighting a main target area in the query image. The convolution processing parameter may include, but is not limited to, at least one of a convolution kernel, a convolution kernel size, a dilation factor and a convolution step size. In an embodiment, a kernel used in convolution processing may vary according to the convolution processing parameter. In an embodiment, the feature information may be a feature map. The kernel may be referred to as a filter.

Further, the performing convolution processing on the first feature information based on a first convolution processing parameter corresponding to the target area to obtain the third feature information corresponding to the target area may include: performing convolution processing on the first feature information based on the first convolution processing parameter corresponding to the target area, wherein the first feature information may be a feature map with a size of H*W*C, and the feature information obtained as a result of the convolution processing on the first feature information may be a feature map with a size of H*W*1; normalizing the feature information obtained as a result of the convolution processing, for example, normalizing the feature map by a sigmoid operation, that is, normalizing the value of the feature map to an interval [0, 1], thereby obtaining a feature map with a size of H*W*1; performing a stacking operation on the normalized feature information, wherein feature maps, of which the number is the same as that of the channels of the first feature information, may be copied by the stacking operation, such that a feature map with a size of H*W*C may be obtained, and according to the above example, for example, 512 feature maps in the same size may be obtained by copying, the obtained respective feature maps consistent with the size of the first feature information, for example, a 512*7*7 feature map; and performing fusion processing (for example, a point multiplication operation and the like) on the feature information after the stacking operation to obtain the third feature information corresponding to the target area, that is the third feature information corresponding to the ASAU, wherein the third feature information corresponding to the ASAU may be a feature map with a size of H*W*C.

Figure 4A:
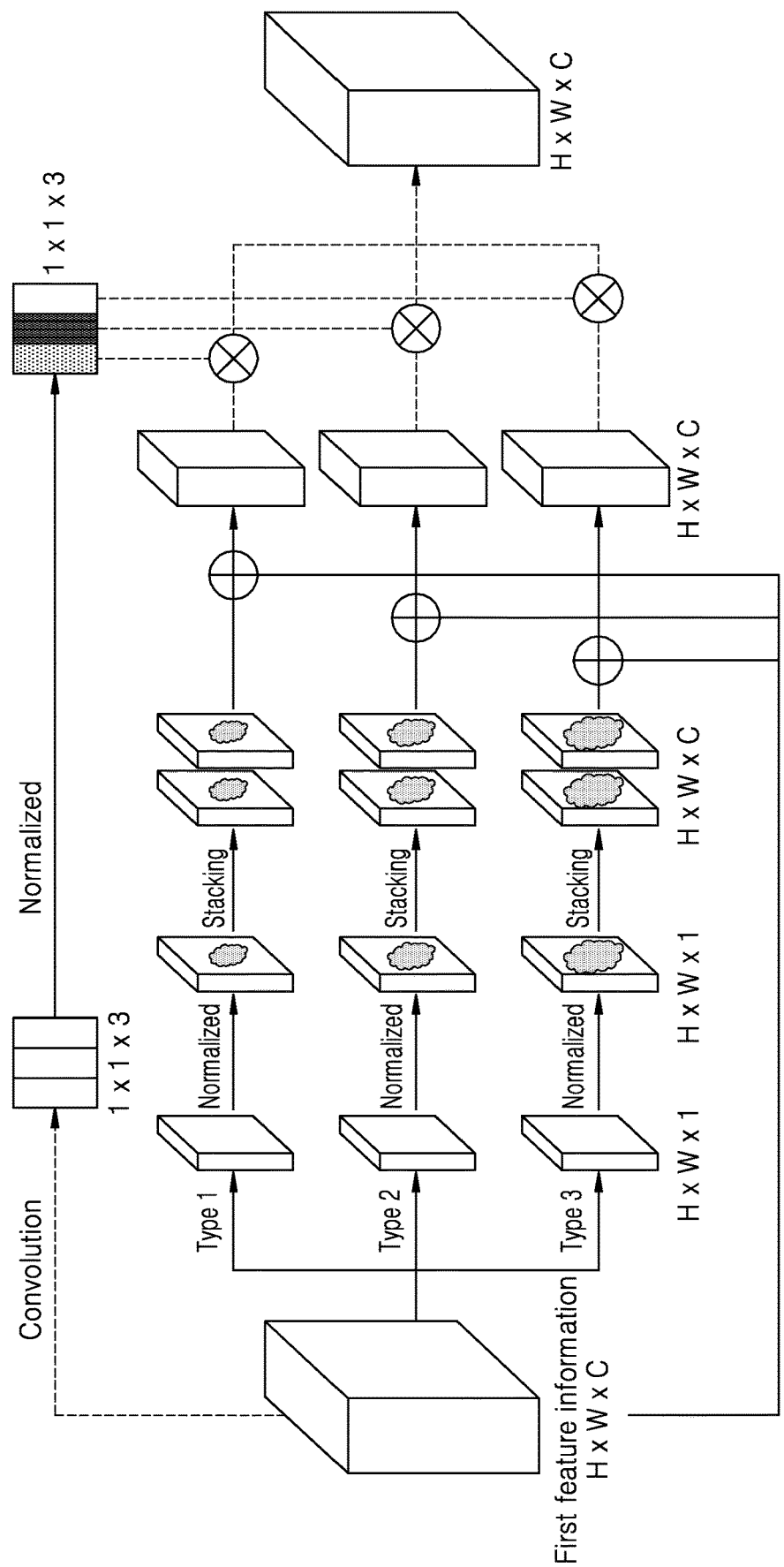
FIG. 4A is a diagram illustrating an example procedure using an ASAU structure according to an embodiment of the disclosure.

FIG. 4A is a diagram illustrating an example procedure using an ASAU structure according to an embodiment of the disclosure.

Figure 4B:
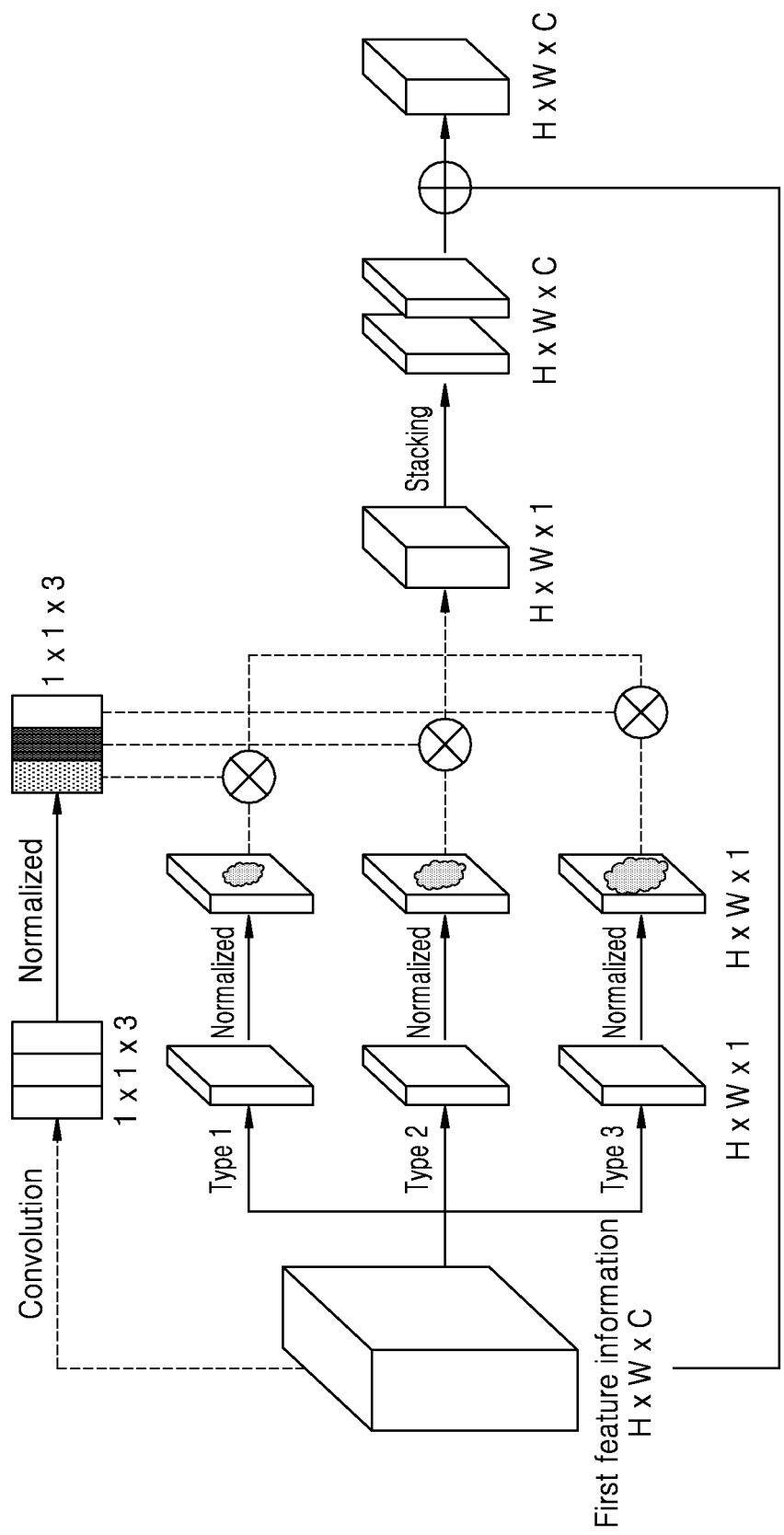
FIG. 4B is a diagram illustrating another example procedure using an ASAU structure according to an embodiment of the disclosure.

FIG. 4B is a diagram illustrating another example procedure using an ASAU structure according to an embodiment of the disclosure.

Referring to FIG. 4A, an ASAU may contain a feature extraction processes for three scales respectively, but is not limited thereto. Because the query image may contain detailed information in various scales. For example, a clothing image includes details such as a pocket, a collar, a button, etc., and a scale of the pocket is larger than a scale of the collar, and the scale of the collar is larger than a scale of the button. Therefore, the ASAU may further process feature information based on different scales to obtain feature information of multiple scales, and the feature information of multi scale may be weighted and fused, so that objects (for example a pocket, a collar, a button, and the like in the clothing image, but are not limited thereto) may be highlighted in different scales, belonging to the target area, in the final feature map, thereby obtaining feature information corresponding to the target area and capable of reflecting various detailed information, which may further improve the accuracy of the searching result.

In an embodiment, different scales may be implemented by different forms of convolution processing parameters. That is, it may be implemented by Step SA that the ASAU processes the first feature information based on different scales.

Step SA: performing convolution processing at least twice on the first feature information based on the first convolution processing parameter corresponding to the target area, to obtain respective pieces of fourth feature information corresponding to the target area, wherein the first convolution processing parameters used in each convolution processing are different.

In other words, the convolution processing parameters used in each convolution processes may be different, and the first convolution processing parameters corresponding to the target area used in each convolution processing may be different, and consequently scales for processing the first feature information may be different. In an embodiment, the convolution processing parameters that character different scales may include, but are not limited to, a dilation factor (DF), for example, different dilation ratios corresponding to different scales, that is, when the ASAU performing convolution processing at least twice on the first feature information, the used dilation ratios may be different. In this case, other convolution processing parameters except the dilation ratios may be the same or different, and the convolution kernels, the convolution step size, and the like may be the same or different, but is not limited thereto. That is, in an embodiment, the convolution processing parameters used in each convolution processes include at least one of the following: a convolution kernel, a convolution kernel size, a dilation factor, and a convolution step size, but is not limited thereto.

Type 1, Type 2, and Type 3 in FIG. 4A represent three types of convolution processing parameters, which are three different scales, and three groups of different convolution processing parameters, that is, performing the convolution processing three times on the first feature information respectively based on the three different groups of the first convolution processing parameters corresponding to the target area. If the first feature information is a feature map with a size of H*W*C, three times of convolution processing may be performed on the first feature information to obtain three feature maps with a size of H*W*1.

Figure 5:
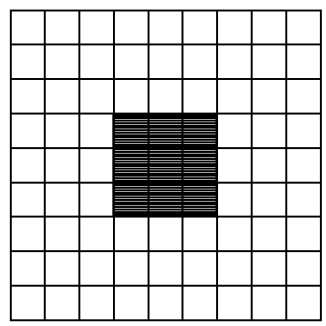
FIG. 5 is a diagram illustrating an example of convolution processing parameters of different scales according to an embodiment of the disclosure.
Figure 5:
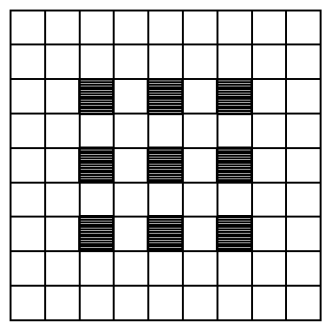
Figure 5:
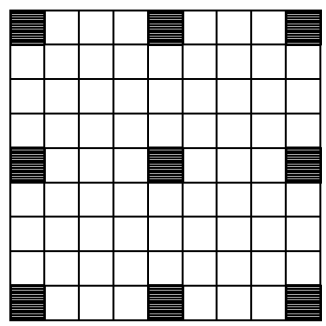

FIG. 5 is a diagram illustrating an example of convolution processing parameters of different scales according to an embodiment of the disclosure.

Referring to FIG. 5, as an example, it illustrates three types of convolution processing parameters, including a kernel size (K in FIG. 5), a dilation factor (DF in FIG. 5), and the like, but is not limited thereto. The size of the dilation factor reflects a size of scales. For example, when DF=1, it means a small scale and is capable of capturing more detailed information in the image. For example, when DF=2, it means a medium scale and may weaken the extraction of detailed information, but is capable of extracting main outline information. For example, when DF=4, it may weaken the extraction of detailed information than when DF=2, but is capable of extracting more distinguishing outline information. In general, as the DF value becomes higher, it is more likely to extract the main outline of the object in the image, and the expression of the detailed information is gradually weakened. Then, in order to obtain complete and more abundant feature information, information in different scales may be jointly expressed by Step SB, thereby expressing more accurate feature information.

Step SB: performing fusion processing according to respective pieces of fourth feature information to obtain third feature information corresponding to the target area.

In an embodiment, after each of the pieces of fourth feature information corresponding to each scale is obtained in Step SA, when the contribution of the feature information in each scale to the final processing result may be not the same, the calculating method of weights may be introduced in Step SB, that is, fusion processing may be performed on the respective pieces of fourth feature information based on the weights respectively corresponding to the respective pieces of fourth feature information.

Previously, the calculating method of weights may use a second convolution processing parameter corresponding to the target area. A pre-designed convolution kernel may be used to perform the convolution processing on the first feature information based on the second convolution processing parameter corresponding to the target area. According to the result of the convolution processing, the weights respectively corresponding to respective pieces of fourth feature information may be obtained, that is, the output may be a weight that is consistent with the number of scales (for example, when three scales are contained in the ASAU, three weights are output). The second convolution processing parameter may include at least one of a convolution kernel, a convolution kernel size, a dilation factor, and a convolution step size, but is not limited thereto. In an embodiment, the backpropagation algorithm widely used in neural network training may be used to minimize the loss function to calculate the weight.

In an embodiment, the obtaining the weights respectively corresponding to each of the pieces of fourth feature information according to the result of the convolution processing, may include: normalizing the result of the convolution processing, for example, normalizing the weights respectively corresponding to the respective pieces of fourth feature information to the interval of [0, 1] by using the sigmoid operation, to obtain the weights respectively corresponding to the respective pieces of fourth feature information. When the first feature information is a feature map with a size of H*W*C, for example, the number of channels C=3, the result of the convolution processing may be a feature map with a size of 1*1*3, and the size of the normalized feature map may be 1*1*3. In this feature map, each feature value represents the weight of the corresponding scale, as shown in FIG. 4A.

Further, after obtaining the fourth feature information in different scales and the corresponding weights obtained by Step SA, the fusion processing may be performed in Step SB.

The weight may be multiplied by the fourth feature information in the corresponding scale, and respective products may be added to obtain the result of the deep fusion, that is, the third feature information, corresponding to the ASAU, of which the size and quantity are consistent with these of the first feature information respectively, for example, a feature map with a size of H*W*C, which is the processing result of the ASAU structure.

Referring to FIG. 4A, the ASAU contains three scales, which is an example and should not be construed as limiting the number of scales. The operation involved in the dotted-line portion is intended to calculate the weight, reflecting the contribution of the feature information in different scales to the final processing result. The flows involved in the solid line portion are intended to perform convolution processing on the first feature information in different scales, to obtain the main target area in the image based on this, and ignore the irrelevant area.

In an embodiment, as may be seen in conjunction with FIG. 4A, Step SA may include:

performing convolution processing at least twice on the first feature information based on the first convolution processing parameters corresponding to the target area, wherein the first convolution processing parameters used in each convolution processing are different, and when the first feature information is a feature map with a size of H*W*C, the feature information obtained after convolution processing may be a feature map with a size of H*W*1; performing the following processing for feature information obtained after each convolution processing: normalizing the feature information obtained after convolution processing, for example, normalizing the feature map after convolution processing by a sigmoid operation, that is, normalizing the value of the feature map to an interval [0, 1], wherein the normalized feature information may be a feature map with a size of H*W*1; performing a stacking operation on the normalized feature information, wherein feature maps, of which the number is the same as that of the channels of the first feature information, are copied by the stacking operation, and according to the above example, for example, 512 feature maps in the same size are obtained by copying, wherein the obtained respective feature maps constitute a feature map that is consistent with the size of the first feature information, for example, a feature map with a size of H*W*C, e.g., a 512*7*7 feature map;

performing fusion processing on the feature information after the stacking operation and the first feature information, which is for example a point multiplication operation, etc., to respectively obtain the corresponding fourth feature information after each convolution processing, wherein the size of the fourth feature information, for example, a feature map with a size of H*W*C is consistent with that of the first feature information.

In other words, the ASAU uses each scale to perform processing in the same manner, i.e., obtaining the fourth feature information by performing operations of convolution, sigmoid, stacking, and fusion on the first feature information respectively, for fusing with the corresponding weight to obtain the third feature information corresponding to the ASAU.

In another possible manner, the weight is multiplied by the fourth feature information in the corresponding scale, and respective products are added to obtain the result of the deep fusion, which is stacked and fused to obtain the third feature information, corresponding to the ASAU, of which the size and quantity are consistent with these of the first feature information respectively, which are the processing result of the ASAU structure.

Referring to FIG. 4B, the ASAU contains three scales, which is an example and should not be construed as limiting the number of scales. Wherein, the operation involved in the dotted-line portion is intended to calculate the weight, reflecting the contribution of the feature information in different scales to the final processing result. The flows involved in the solid line portion are intended to perform convolution processing on the first feature information in different scales, to obtain the main target area in the image based on this, and ignore the irrelevant area.

In an embodiment, as may be seen in conjunction with FIG. 4B, Step SA may include:

performing convolution processing at least twice on the first feature information (for example, a feature map with a size of H*W*C) based on the first convolution processing parameters corresponding to the target area, wherein the first convolution processing parameters used in each convolution processing are different, and Type 1, Type 2, and Type 3 in FIG. 4B represent three types of convolution processing parameters, which are three different scales, and also three groups of different convolution processing parameters, that is, performing the convolution processing three times on the first feature information respectively based on the three groups of different first convolution processing parameters corresponding to the target area, such that three feature maps with a size of H*W*1 may be obtained;

normalizing the feature information obtained after convolution processing for the feature information obtained after each convolution processing, for example, normalizing the feature map after convolution processing by a sigmoid operation, that is, normalizing the value of the feature map to an interval [0, 1], to obtain the corresponding fourth feature information, wherein the fourth feature information may be a feature map with a size of H*W*1.

Further, Step SB may include:

performing fusion processing according to the respective fourth feature information, and, performing fusion processing on the respective fourth feature information based on the weights respectively corresponding to the fourth feature information, wherein the fused feature information may be a feature map with a size of H*W*1, and the feature map may also be referred to as an attention map;

performing a stacking operation on the feature information obtained after the fusion, wherein feature maps, of which the number is the same as that of the channels of the first feature information, are copied by the stacking operation, and according to the above example, for example, 512 feature maps in the same size are obtained by copying, wherein the obtained respective feature maps constitute a feature map that is consistent with the size of the first feature information, for example, a feature map with a size of H*W*C, e.g., a 512*7*7 feature map;

performing fusion processing on the feature information after the stacking operation and the first feature information, which is for example a point multiplication operation, etc., to respectively obtain the third feature information corresponding to the target area, wherein the size of the third feature information corresponding to the target area, for example, a feature map with a size of H*W*C, is consistent with that of the first feature information.

In other words, the ASAU uses each scale to perform processing, and uses the same manner to perform convolution and sigmoid operation on the first feature information to respectively obtain the corresponding fourth feature information for fusing with the corresponding weights, which is then subjected to convolution and sigmoid operation to obtain the third feature information corresponding to the ASAU.

It should be understood that those skilled in the art may select and modify any one of the foregoing ASAU structures according to needs. Further, in operation S202, a full connection operation may be performed according to the respective third feature information corresponding to the ASAU to obtain the second feature information corresponding to the target area of the image. The implementation of the ASAU in operation S202 will be described in detail below.

Figure 6:
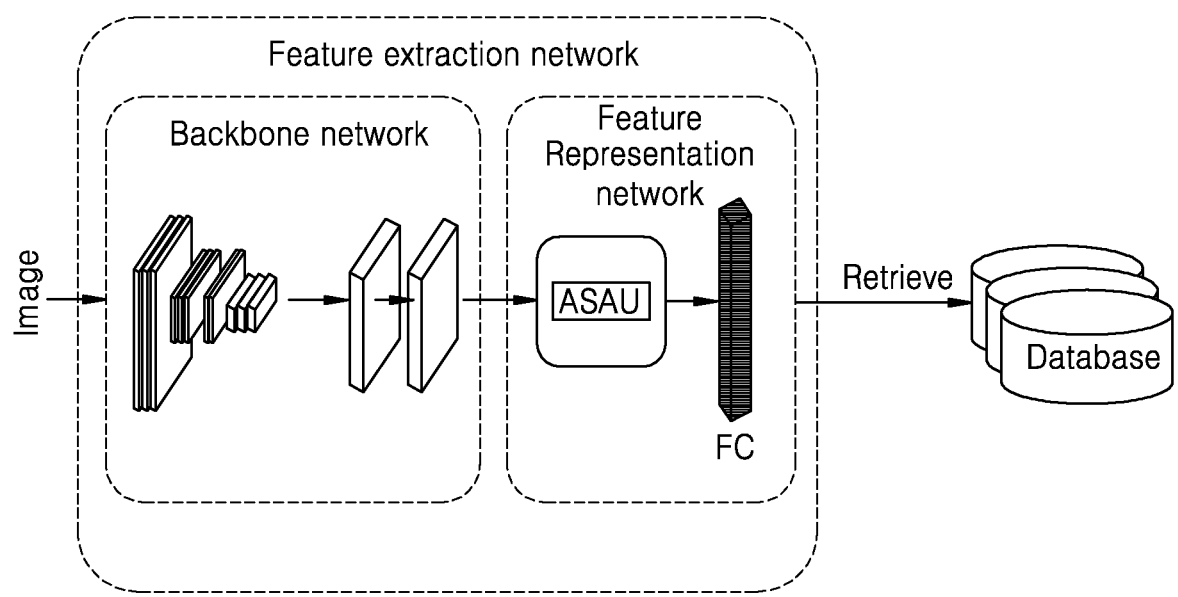
FIG. 6 is a diagram illustrating an example procedure using one ASAU according to an embodiment of the disclosure.

FIG. 6 is a diagram illustrating an example procedure using one ASAU according to an embodiment of the disclosure.

Referring to FIG. 6, in an embodiment, in operation S202, for the target area of the image, the first feature information is processed by an ASAU to perform the feature information processing to obtain the third feature information corresponding to the ASAU, that is, the third feature information corresponding to the target area of the image; further in operation S202, a full connection operation is performed on the third feature information corresponding to the ASAU to obtain second feature information corresponding to the target area of the image, and performing the image searching in the database by using the second feature information to search for a matched image. The feature representation network in FIG. 6 may also be referred to as a feature processing network.

That is, in the feature extraction process of the image searching, the first feature information output by the backbone network may be performed with the feature information processing by an ASAU, which the specific processing may be referred to the introduction of the ASAU and will not described herein. The results of the ASAU are then connected by a full connection (FC) layer to obtain second feature information corresponding to the target area of the image, for example, a 512-dimensional feature vector. Wherein, an ASAU and a full connection (FC) layer may be contained in a feature representing network, that is, the output of the feature representation network is the second feature information corresponding to the target area of the image.

Figure 7:
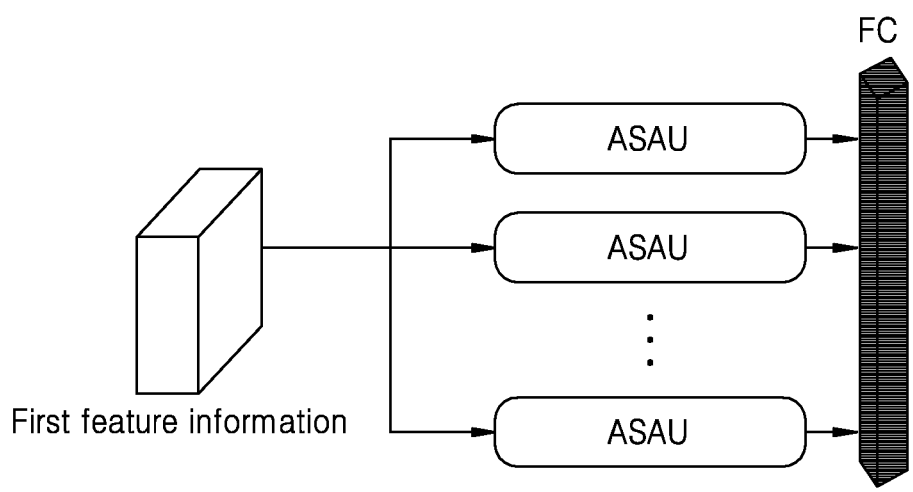
FIG. 7 is a diagram illustrating an example procedure using a plurality of ASAUs according to an embodiment of the disclosure.

FIG. 7 is a diagram illustrating an example procedure using a plurality of ASAUs according to an embodiment of the disclosure.

Referring to FIG. 7, in an embodiment, in operation S202, for at least two target areas, the first feature information is respectively subjected to corresponding feature information processing by at least two ASAUs, to obtain the third feature information corresponding to respective ASAUs, wherein, the different third feature information corresponding to the ASAUs may represent different areas of the image. Further, in operation S202, a full connection operation is performed on the respective piece of third feature information, to obtain the second feature information corresponding to the target area of the image.

That is, in the feature extracting process of the image searching, the first feature information output by the backbone network may be subjected to feature information processing by at least two ASAUs, which the specific processing procedure of each ASAU may be referred to the introduction of the ASAU and will not be described herein. The results of a plurality of ASAUs are then connected by the full connection (FC) layer to obtain the second feature information corresponding to the target area of the image. Wherein, the respective ASAUs focus on different areas of the image, and taking the clothing searching scenario in the above example as an example, ASAU1 may mainly focus on the area where the collar is located in the clothing image, and ASAU2 may mainly focus on the area where the pocket is located in the clothing image.

Figure 8:
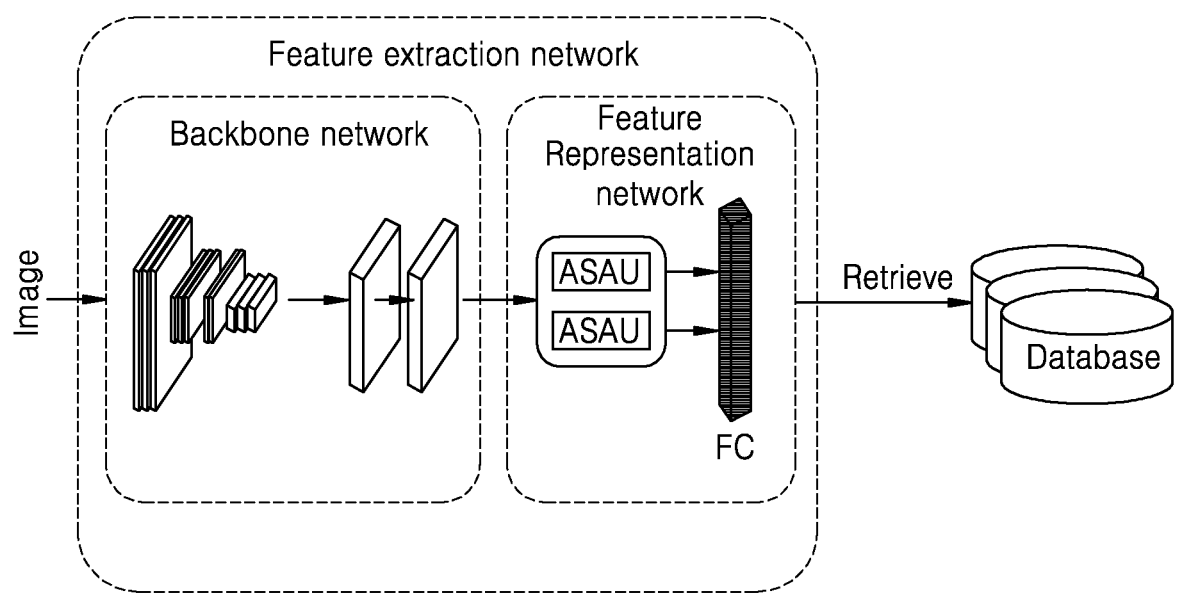
FIG. 8 is a diagram illustrating an example procedure using two ASAUs according to an embodiment of the disclosure.

FIG. 8 is a diagram illustrating an example procedure using two ASAUs according to an embodiment of the disclosure.

Referring to FIG. 8, in an embodiment, at least two ASAUs and one full connection (FC) layer may be contained in a feature representation network, that is, a processing procedure of the feature representation network shown in FIG. 7, wherein the output of the feature representation network is the second feature information corresponding to the target area of the image.

Through the feature representation network, the feature information of the target area may be further extracted from the first feature information output by the backbone network, and compared with the structure of the feature representation network which only performs average processing and then performs full connection processing. In an embodiment, the feature information of respective local areas in the target area of the image may be further obtained, such that more robust features may be obtained because the local features are relatively stable and have little influence on the shape or angle of the object, which greatly improving the accuracy of the image searching results.

In an embodiment, the image corresponds to at least two target area groups, and each target area group contains at least one target area, wherein each target area group may represent a target area of the image.

Figure 9:
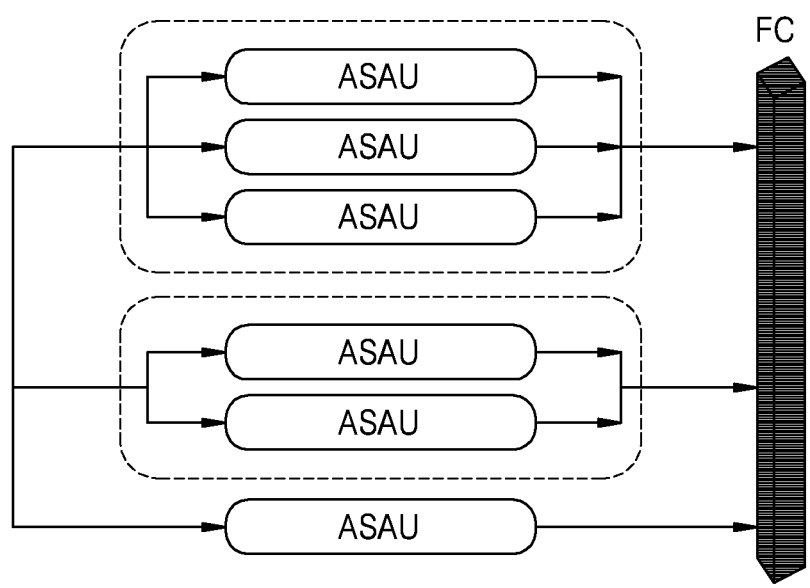
FIG. 9 is a diagram illustrating an example of procedures using at least two groups of ASAUs according to an embodiment of the disclosure.

FIG. 9 is a diagram illustrating an example of procedures using at least two groups of ASAUs according to an embodiment of the disclosure.

Referring to FIG. 9, in operation S202, for each target area, the first feature information is subjected to the corresponding feature information processing by the corresponding ASAU, to obtain the third feature information corresponding to the ASAU (i.e., the third feature information corresponding to the target area); further in operation S202, the respective third feature information corresponding to the target area is fully connected, to obtain the second feature information corresponding the target area of the image. in operation S202, the third feature information corresponding to respective target areas in each target area group may be performed with the fusion processing to obtain the fifth feature information corresponding to respective target area groups, which each fifth feature information is capable of representing the target area of the image as described above; each fifth feature information is subjected to the fusion processing to obtain the second feature information corresponding to the target area of the image, which the second feature information corresponding to the target area of the image may be obtained by performing the fully connection operation according the respective fifth feature information. According to an embodiment, before performing the fusion on the respective fifth feature information, a global average pooling (GAP) operation may be performed on the respective fifth feature information, and the full connection operation may be further performed on the respective feature information obtained after pooling.

That is, in the feature extraction process of the image searching, the feature information processing may be performed on the first feature information output by the backbone network, through at least two groups of ASAUs, which each group includes at least one ASAU. In an embodiment, each group may contain a different number of ASAUs. The specific processing procedure of each ASAU may be referred to the above introduction to ASAU, which details are not described herein again. As shown in FIG. 9, it may also be understood that the first feature information output by the backbone network is processed by a multi-branch structure, of which each branch is an above target area group, each branch contains at least one ASAU and represents a local area in different scale, which may also be considered as a local area with different granularities.

As an example, one branch structure is set to contain one ASAU, which the ASAU may be considered as mainly focusing on global information, and two branch structures are respectively set to respectively contain two and three ASAUs. More contained ASAUs indicate the finer granularity size of the processing of the branch. Then, the results of respective ASAUs of each branch are fused, that is, the information output by the ASAUs is fused, to obtain higher-level semantic information, thereby obtaining a more concise expression result of the branch, and the fusion results of respective branch are fused. The total fusion result of the multiple branches is then connected through the full connection (FC) layer, to obtain the second feature information corresponding to the target area of the image.

Since the local area contained in the target area of each image may also be considered as multi-scale, the processing result of such multi-branch may focus on local areas in different scales, such that more comprehensive feature information may be obtained and the searching results are more accurate.

For example, in FIG. 9, three branches are taken as an example. Each branch contains a different number of ASAU units, and the branch contains one ASAU for extract a target area of the image and focusing on describing the overall feature information such as the outline of the target area. In addition to the overall feature information, the target area also contains more detailed information. Therefore, based on the branch containing one ASAU, there are two branches, which contain 2 ASAUs and 3 ASAUs respectively, and may be used to extract detailed information of the target area, for example, in the clothing searching of the above example, containing a small area such as a collar and a pocket button in the clothing image.

Figure 10:
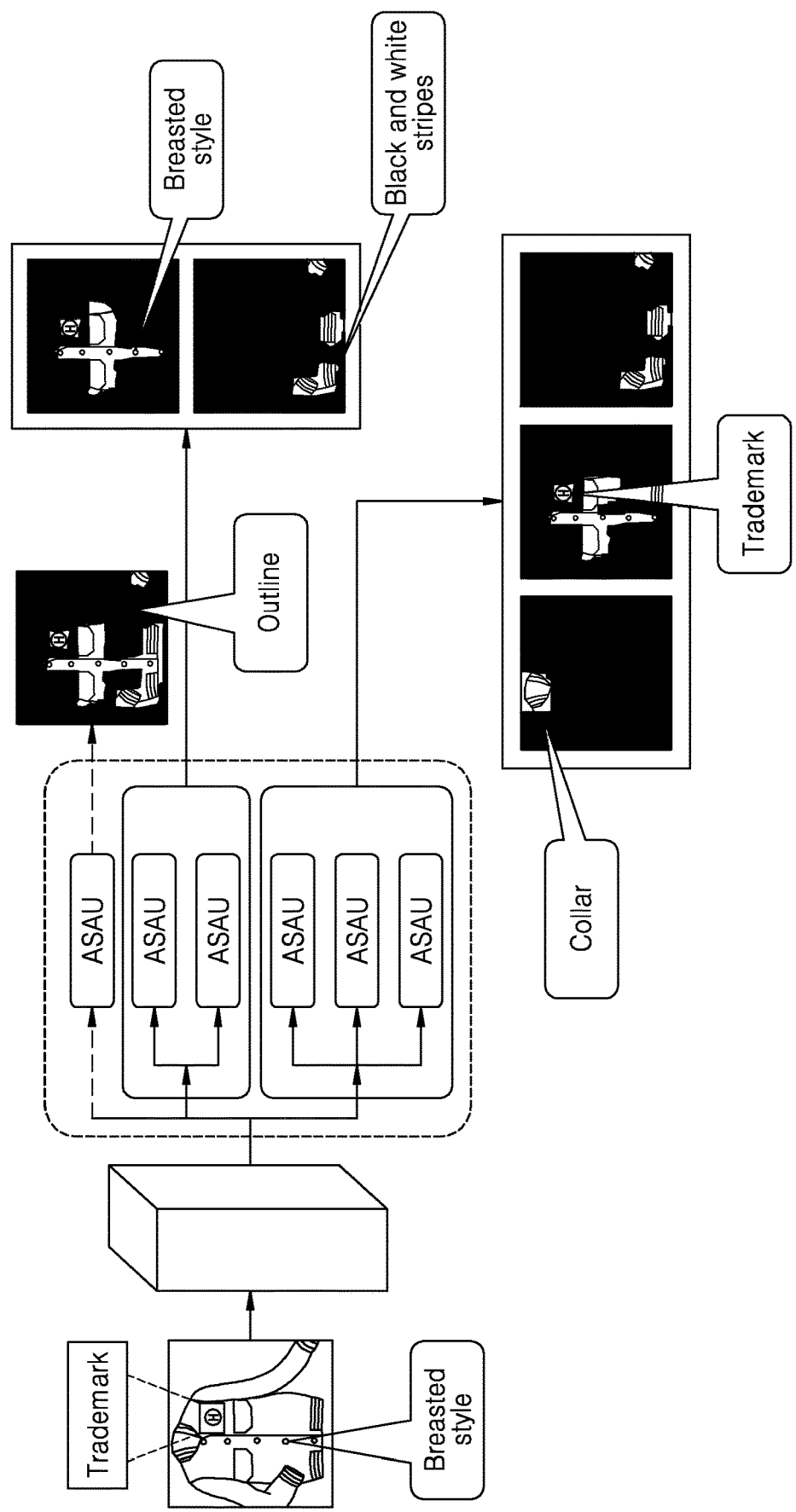
FIG. 10 is a diagram illustrating an example method of processing a clothing image using at least two ASAUs according to an embodiment of the disclosure.

FIG. 10 is a diagram illustrating an example method of processing a clothing image using at least two ASAUs according to an embodiment of the disclosure.

Referring to FIG. 10, as an example, a process of performing feature extraction in a clothing image is shown. First, the outline information may be obtained by extracting the feature information of the entire target area through the dotted line portion, that is, the dotted line portion is the branch containing one ASAU. As described above, an ASAU may be a procedure based on multi-scale. In an embodiment, a feature map obtained by convolution processing based on one of the scales is extracted; by determining a threshold value, a value in the feature map greater than the threshold is changed to 1, otherwise it is changed to 0; the modified feature map is proportionally mapped to the image. It may be seen from the mapped image that the target area is enhanced, and the background area may be disappeared.

Further, the feature information of the local area in the target area is extracted by the solid line portion. Taking the branch containing three ASAUs in the solid line portion as an example for description, the manner for mapping the local area is described in the dotted line portion and will not be described herein. Through the processing of the branch, three parts of results may be obtained, wherein in FIG. 10, in the uppermost part, the collar portion is extracted, and in the lowermost part, the feature information of the black and white interval of the sleeve and the lower edge of the clothes is extracted. It should be noted in particular that the middle part not only extracts the local objects (objects may also be called articles, components, parts, etc.) such as breasted buttons in the clothes, but also extracts small and easily overlooked detailed information such as a trademark, which reflects the advantages of the multi-scale ASAU structure. Taking the branch containing two ASAUs in the solid line portion as an example for description, the manner for mapping the local area is described in the dotted line portion and will not be described herein. Through the processing of the branch, two parts of results may be obtained, wherein, in the uppermost part, detailed information such as the breasted buttons is extracted, and in the lowermost part, the feature information of the black and white interval of the sleeve and the lower edge of the clothes is extracted.

Referring to FIG. 10, the dotted line portion may be considered to have extracted the global information, and the solid line portion may be considered to have extracted small and easily overlooked local information.

Figure 11:
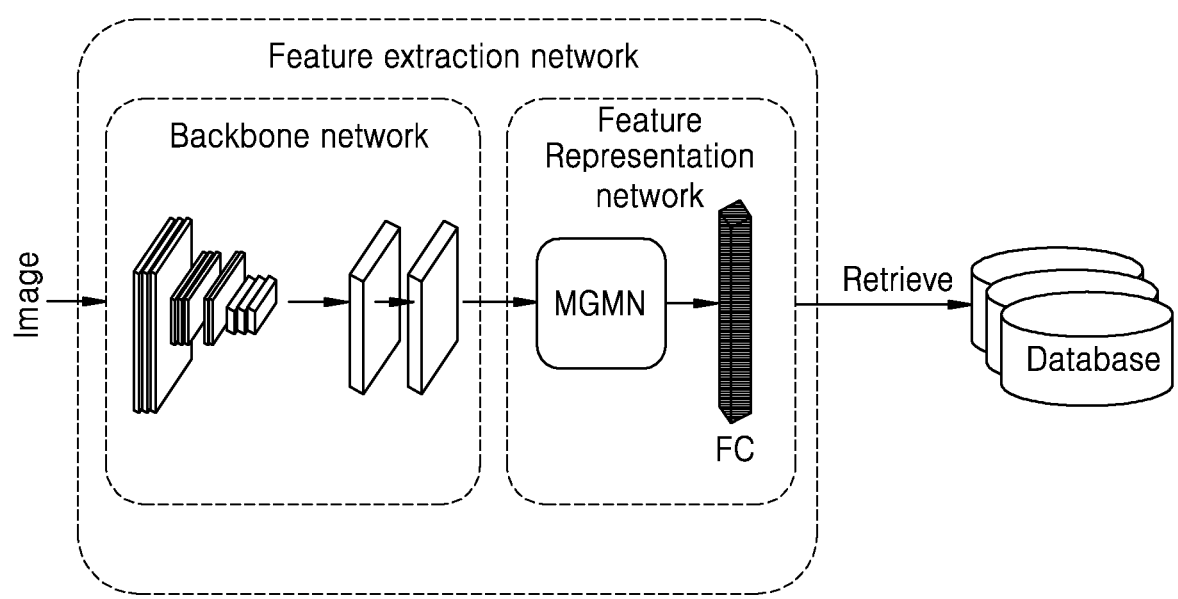
FIG. 11 is a diagram illustrating an example procedure using a multi-granularity mining network (MGMN) according to an embodiment of the disclosure.

FIG. 11 is a diagram illustrating an example procedure using a multi-granularity mining network (MGMN) according to an embodiment of the disclosure.

Referring to FIG. 11, in an embodiment, at least two ASAUs of multiple branches may be contained in a multi-granularity mining network (MGMN). An MGMN and a full connection (FC) may be contained in a feature representation network. Wherein, the input of the MGMN is the first feature information output by the backbone network, and the result output by the MGMN (that is, the output result after fusing the respective branches) is subjected to the full connection layer, to obtain the second feature information corresponding to the target area of the image, i.e., the feature information output by the feature representation network.

In combination with the above, the MGMN in an embodiment has two major advantages:

1) It is possible to combine information in different granularities. For example, for a clothing image, information expression in different levels may be obtained from areas in different sizes. For example, when focusing on the whole image, the overall outline of the clothes may be seen, and more detailed information is ignored; when focusing on a certain area, such as the upper part of the clothes, a style of the collar or even smaller details (such as textures) may be extracted; when focusing on an area containing a trademark, the trademark itself will be extracted to more accurately describe and express it.

2) It may be possible to automatically calculate image areas in different sizes. For example, for a clothing image, not all areas in the image contribute the same to the final processing result, and in fact, some contribute largely and some contribute less, which are not fixed. For example, for two pieces of clothing, which one having breasted buttons but the other one not, and the other parts are very similar, then during image searching, the feature information of breasted buttons will obviously play a greater role, and will be given a greater weight accordingly. The ASAU in the MGMN contains learning processes for weights in different scales, and may automatically learn which area has a greater effect to give a higher weight, so that the final feature representation is more robust and accurate.

It may be seen from the above that when performing the feature information processing, by the at least two ASAUs, on the first feature information output by the backbone network, respective ASAUs focus on different areas of the image. Considering that different areas focused by respective ASAUs may have connection with each other.

Figure 12:
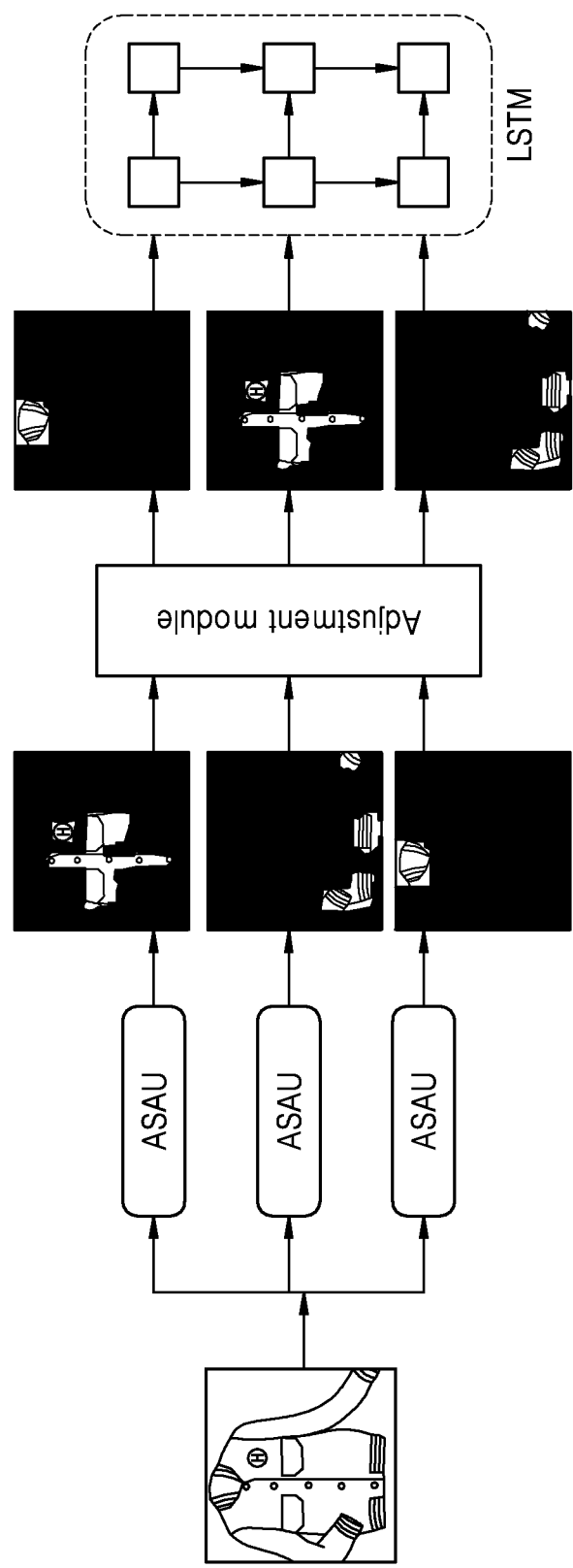
FIG. 12 is a diagram illustrating an example process for adding a spatial constraint processing according to an embodiment of the disclosure.

FIG. 12 is a diagram illustrating an example process for adding a spatial constraint processing according to an embodiment of the disclosure.

Referring to FIG. 12, by using the LSTM mechanism to simulate the relative positional relationship between the areas, the feature information output by respective ASAUs is jointly enhanced, to enhance spatial constraint between each other, such that the respective processed feature information is capable of reflecting spatial relationship between areas, and the enhanced results are connected by the full connection (FC) layer, to obtain the second feature information corresponding to the target area of the image.

After operation S202, that is, after the feature information processing is performed on the first feature information by the at least two ASAUs to obtain the third feature information corresponding to respective ASAUs, the respective pieces of third feature information corresponding to respective target areas may be sequentially input to a preset LSTM network according to the positional relationship of respective target areas, to output the third feature information corresponding to respective ASAUs after the relationship enhancement.

In an embodiment, the input order of respective pieces of third feature information corresponding to respective ASAUs is determined according to the positional relationship of respective target areas and the centroid information of the third feature information corresponding to respective target areas, for example, the positional relationship of respective target areas may be from top to bottom, from the left to the right, from the inside to the outside, and the like, which is not limited herein. In an embodiment, the input order of respective pieces of third feature information may be determined by the adjustment module in FIG. 12.

Further, according to the determined input order, respective pieces of third feature information is sequentially input to the preset LSTM, and the relationship-enhanced feature information is output. The LSTM is widely used in Natural Language Processing (NLP) because that languages are sequential and there are natural relationships between words, these relationships may be organized into meaningful sentences. In an embodiment, the LSTM is applied in image processing, and the image may be simply divided into different portions in a spatial order, and the feature information of the plurality of portions is input into the LSTM.

According to the determined input order, respective pieces of third feature information is sequentially input into the LSTM, and in the feature information output by the LSTM, the subsequent feature information is dependent on the previous feature information, thereby simulating the relationship between the feature information. That is, the LSTM performs joint enhancement processing on the feature information output by respective ASAUs, to enhance the spatial constraint, such that the processed respective feature information may reflect spatial relationships between respective areas. Finally, the LSTM will output a corresponding amount of feature information, and the feature information is relationship-enhanced feature information after considering the mutual relationship, such that the feature information is more distinctive.

Figure 13:
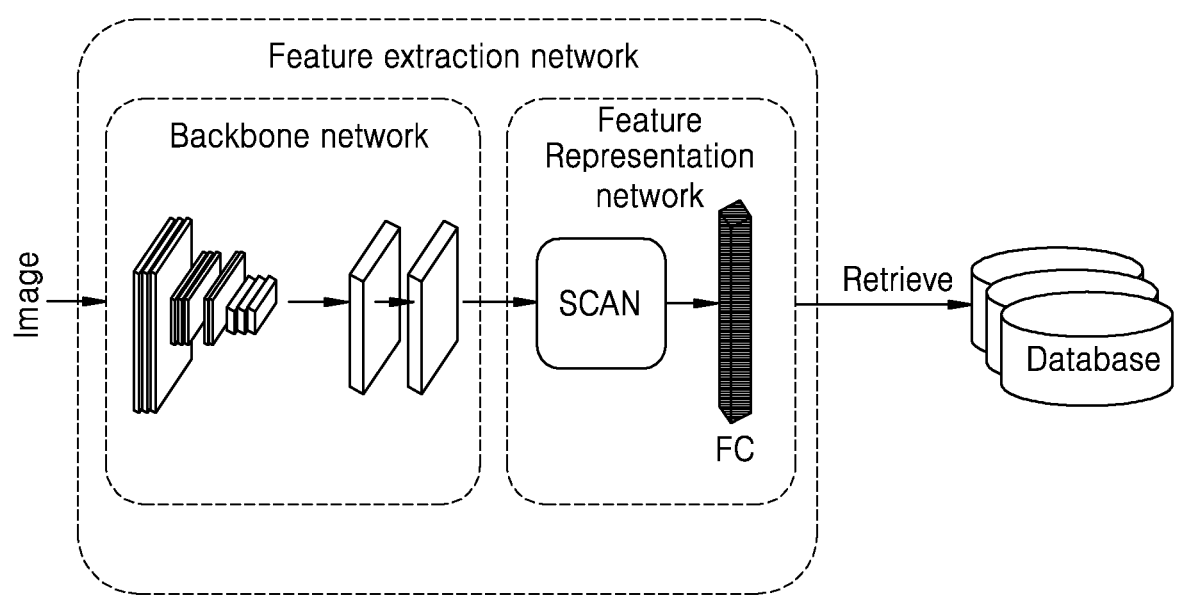
FIG. 13 is a diagram illustrating an example procedure using a spatial constrained attention network (SCAN) according to an embodiment of the disclosure.

FIG. 13 is a diagram illustrating an example procedure using a spatial constrained attention network (SCAN) according to an embodiment of the disclosure.

Referring to FIG. 13, in an embodiment, at least two ASAUs, one adjustment module, and one LSTM network may be contained in a Spatial Constrained Attention Network (SCAN). A SCAN and a full connection (FC) layer may be contained in a feature representation network. Wherein, the input of the SCAN is the first feature information outputted by the backbone network, and the result of the output of the SCAN is the relationship-enhanced feature information, which is input into the full connection layer, and the full connection operation is performed on the relationship-enhanced feature information through the full connection layer, to obtain the second feature information corresponding to the target area of the image.

As an example, taking the processing by three ASAUs as an example, when the input image is an image containing clothing, the feature map is obtained through the backbone network, and the feature information of different local objects in the clothing is separately extracted by using three ASAUs. In an embodiment, one extracts the feature information of the collar, another extracts the feature information of breasted buttons, and the other extracts the feature information of the sleeve, but the relationship among them is uncertain; through the adjustment module, the input order of respective feature information may be determined, to obtain an order with dependency relationship from top to bottom according to the target area, that is, the collar is located on a upper area than the button and the button is located on a lower edge of the clothes. Then, the feature information is sequentially input into the LSTM, and the relationship-enhanced feature information reflecting the relationships between the objects is output after subjecting to the LSTM processing, and the feature information is unique, so that the difference is obvious, and the accuracy of the obtained result is also higher.

In combination with the above, the introduced SCAN In an embodiment has following advantages:

1) It is possible to extract complete object information and simulate the relationship between them. For example, in order to simulate the relationship between the objects from top to bottom in the image, there is also a division method that uniformly divides the image, and respectively acquires feature information for each divided area, and inputs it into the LSTM for processing. However, this inflexible division method does not consider the size of the area of each object in the image, and may cut a complete object, so that the finally obtained feature information cannot correctly correspond to the features of the image, and the enhanced feature information is not accurate. The SCAN network focuses on the area position of the object, and extracts complete areas of the object, so that the obtained feature information is more targeted, and the relationship-enhanced feature information is more accurate.

2) The introduced adjustment module may automatically arrange the relative positional relationships of the objects in the image. The feature information of different objects may be extracted by respective ASAUs, and the objects are arranged according to their original positional relationship by the adjustment module, so that the relationship-enhanced feature information is calculated on the basis of the correct positional relationship. The relationship-enhanced feature information, reflecting the relative positional relationship of respective objects may be obtained, which may greatly improve the searching result.

Figure 14A:
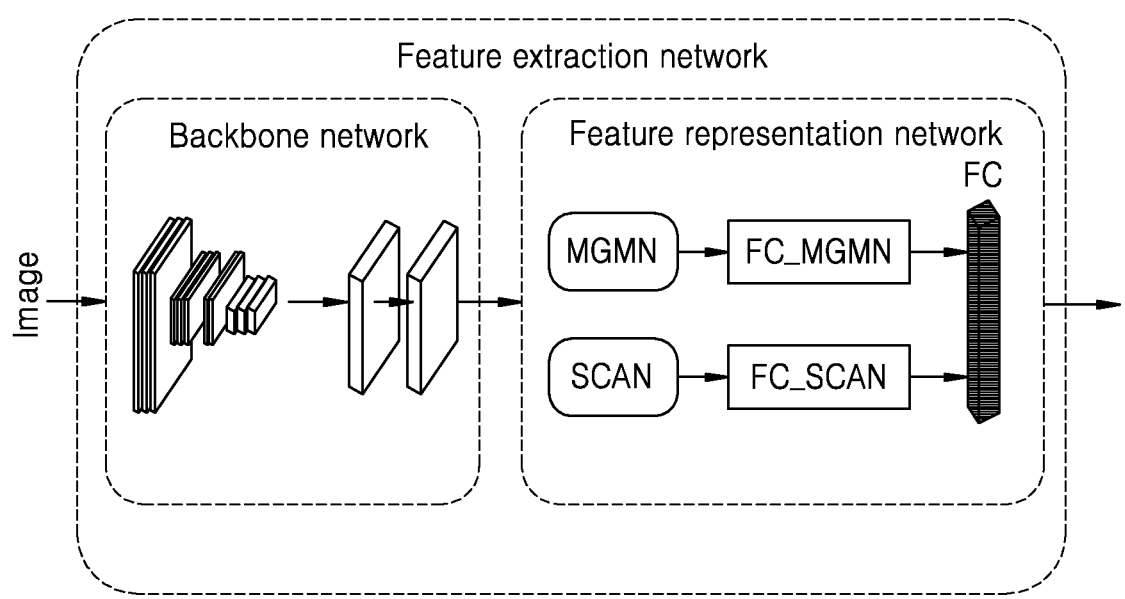
FIG. 14A is a diagram illustrating an example procedure using MGMN and SCAN according to an embodiment of the disclosure.

FIG. 14A is a diagram illustrating an example procedure using MGMN and SCAN according to an embodiment of the disclosure.

Referring to FIG. 14A, the MGMN and the SCAN may also be both contained at the same time. Wherein, independent ASAUs may be deployed in the MGMN and SCAN, respectively, or an ASAU may be shared.

In an embodiment, when the independent ASAUs are respectively deployed in the MGMN and the SCAN, that is, in addition to the MGMN, the first feature information needs again through the SCAN. Wherein, it may be seen from the above that in the MGMN, the processed image corresponds to at least two target area groups, and each target area group contains at least one target area; at this time, at least one target area group of the MGMN is selected, that is, at least one branch of the multiple branches may be selected by the corresponding SCAN (one target area group needs one SCAN for joint enhancement processing, that is, the number of SCANs is consistent with the number of target area groups that need to be enhanced), which may also achieve the similar effect that all branches in the MGMN are enhanced in relationship, and save computing resources to some extent.

Therefore, in an embodiment, at least one target area group is re-acquired by the corresponding number of SCANs, of which the specific acquisition manner may be referred to the description for SCAN in the above, and details are not described herein again. Then, during re-acquiring at least one target area group by the corresponding number of SCANs, for the at least one target area group, the following is respectively performed: inputting the third feature information corresponding to respective target area sequentially into a preset LSTM network according to the positional relationship of respective target areas, and outputting relationship-enhanced third feature information.

In an embodiment, the input order of respective pieces of third feature information is determined according to the positional relationship of respective target areas and centroid information of the third feature information corresponding to respective target areas, for example, the positional relationship of the target areas may be an order from top to bottom, an order from left to right, an order from inside to outside, and the like, which is not limited In an embodiment herein. In an embodiment, the input order of respective pieces of third feature information may be determined through the adjustment module.

Further, the performing fusion processing on each group of the relationship-enhanced feature information, may include: performing the full connection operation on each group of the relationship-enhanced feature information, that is, as shown in FIG. 14A, performing the full connection operation on the output result of at least one SCAN (in FIG. 14A, because the joint enhancement processing is performed on only one target area group as an example, only one SCAN is required) by a full connection layer (FC SCAN), to obtain a first intermediate full connection result.

In addition, in the MGMN, the feature information of respective branches needs to be fused, and a full connection operation is performed on the fusion processing result through a full connection layer (FC MGMN), to obtain a second intermediate full connection result.

Then, the first intermediate full connection result and the second full connection result are input into a full connection (FC) layer, and the full connection operation is performed on the first intermediate full connection result and the second full connection result through the full connection layer, to obtain the second feature information corresponding to the target area of the image.

In complete, the backbone network performs feature extraction on the image, and the output first feature information is processed by the MGMN and the SCAN respectively; the results of respective branches output by the MGMN may be connected via a full connection layer (FC-MGMN in FIG. 14A), the respective feature information output by the SCAN may also be connected via a full connection layer (FC-SCAN in FIG. 14A), and the results obtained by the FC-MGMN and the FC-SCAN are then connection through a full connection layer (FC in FIG. 14A), to obtain the second feature information corresponding to the target area of the image.

In an embodiment, when the ASAU is shared between the MGMN and the SCAN, the SCAN may directly determine an input order of the feature information output by respective ASAUs in the MGMN branch, which acts the input of the LSTM in the SCAN, to improve the efficiency of the processing. In an embodiment, at least one of a plurality of branches of the MGMN may be selected by the corresponding SCAN (one target area group needs one SCAN for joint enhancement processing, that is, the number of SCANs is consistent with the number of target area groups that need to be enhanced), which may also achieve the similar effect that all branches in the MGMN are enhanced in relationship, and save computing resources to some extent. When selecting an ASAU that can be multiplexed, all ASAUs in one branch may be selected.

It may be seen from the above that in the MGMN, the processed image corresponds to at least two target area groups, and each target area group contains at least one target area; for at least one target area group in the MGMN, the third feature information corresponding to respective target areas may be sequentially input into a preset LSTM network according to positional relationship of respective target areas, and relationship-enhanced third feature information may be output.

In an embodiment, the input order of respective pieces of third feature information is determined according to the positional relationship of respective target areas and the centroid information of the respective pieces of third feature information respectively corresponding to respective target areas, for example, the positional relationship of target areas may be from top to bottom, from the left to the right, from the inside to the outside, and the like, which is not limited herein. In an embodiment, the input order of respective pieces of third feature information may be determined by the adjustment module.

Further, the performing fusion processing on each group of the relationship-enhanced feature information, may include: performing the full connection operation on each group of the relationship-enhanced feature information, that is, as shown in FIG. 14A, performing the full connection operation on the output result of at least one SCAN (in FIG. 14A, because the joint enhancement processing is performed on only one target area group as an example, only one SCAN is required) by a full connection layer (FC SCAN), to obtain a first intermediate full connection result.

In addition, in the MGMN, the feature information of respective branches needs to be fused, and a full connection operation is performed on the fusion processing result through a full connection layer (FC MGMN), to obtain a second intermediate full connection result.

Then, the first intermediate full connection result and the second full connection result are re-input into a full connection layer (FC), and the full connection operation is performed on the first intermediate full connection result and the second full connection result through the full connection layer, to obtain the second feature information corresponding to the target area of the image.

Figure 15:
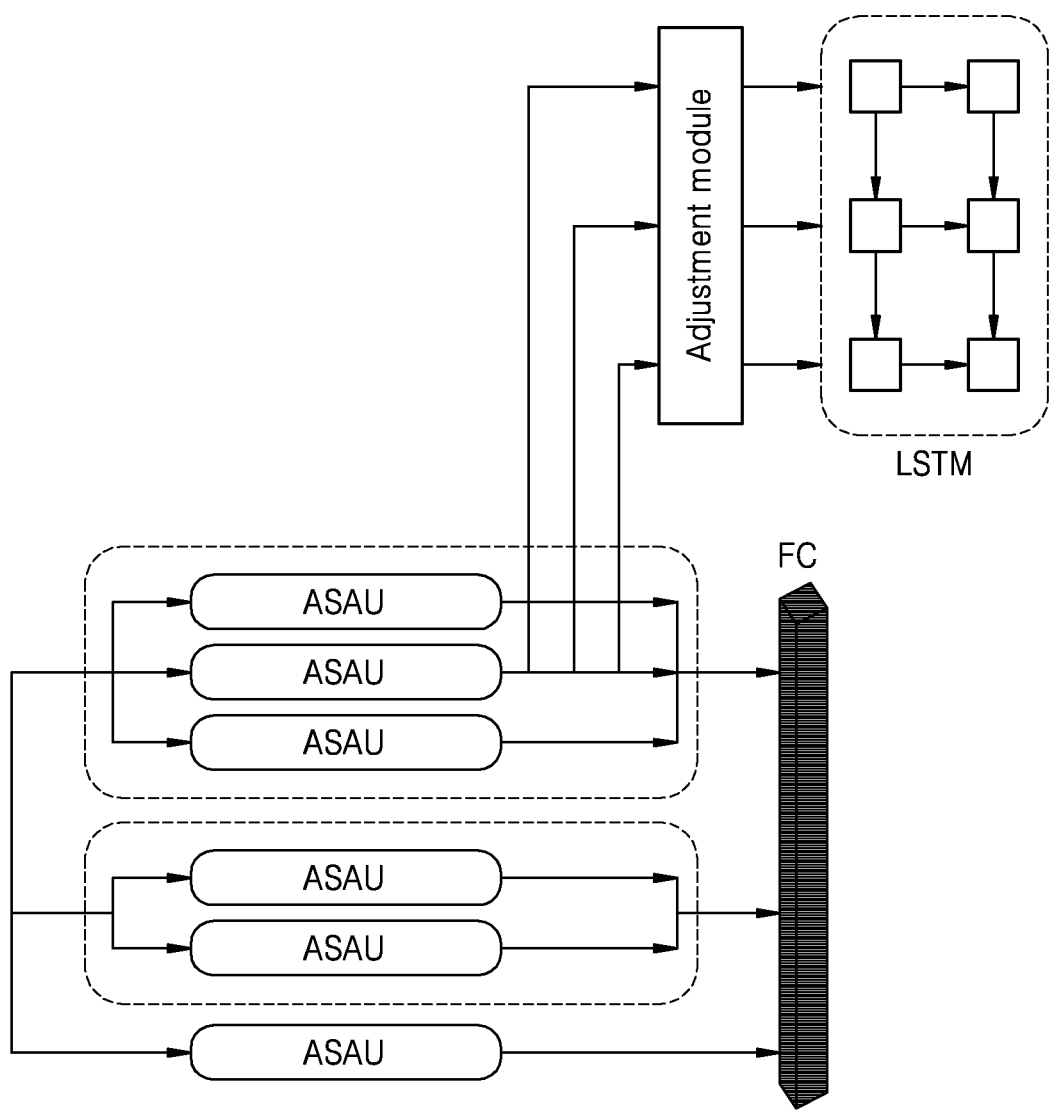
FIG. 15 is a diagram illustrating multiplexing ASAUs in an MGMN and SCAN processing procedure according to an embodiment of the disclosure.

FIG. 15 is a diagram illustrating multiplexing ASAUs in an MGMN and SCAN processing procedure according to an embodiment of the disclosure.

Referring to FIG. 15, as an example, the MGMN contains a branch having three ASAUs, and all ASAUs in the branch are selected for multiplexing. The processing results of the branch processed by the ASAU may be directly used as the input of the LSTM in the SCAN after the adjustment module determines the input order, to improve the processing efficiency.

In an embodiment, one MGMN, one SCAN, and one full connection (FC) layer may be contained in one feature representation network. Wherein, the inputs of the MGMN and the SCAN both are the first feature information output by the backbone network, or the input of the MGMN is the first feature information output by the backbone network, and the input of the SCAN is the information shared by the MGMN (i.e., the information shared by the ASAU in the MGMN). The outputs of the MGMN and the SCAN are respectively subjected to the full connection processing, and then input to the full connection layer, to output and obtain the second feature information corresponding to the target area of the image.

It should be noted that the foregoing fusion processes in an embodiment may be performed in any fusion manner or through a full connection (FC) layer.

In an embodiment, during the convolution processing, the convolution processing parameter may be obtained by learning in advance or training.

According to an embodiment, a feature representation network may be trained offline.

Figure 14B:
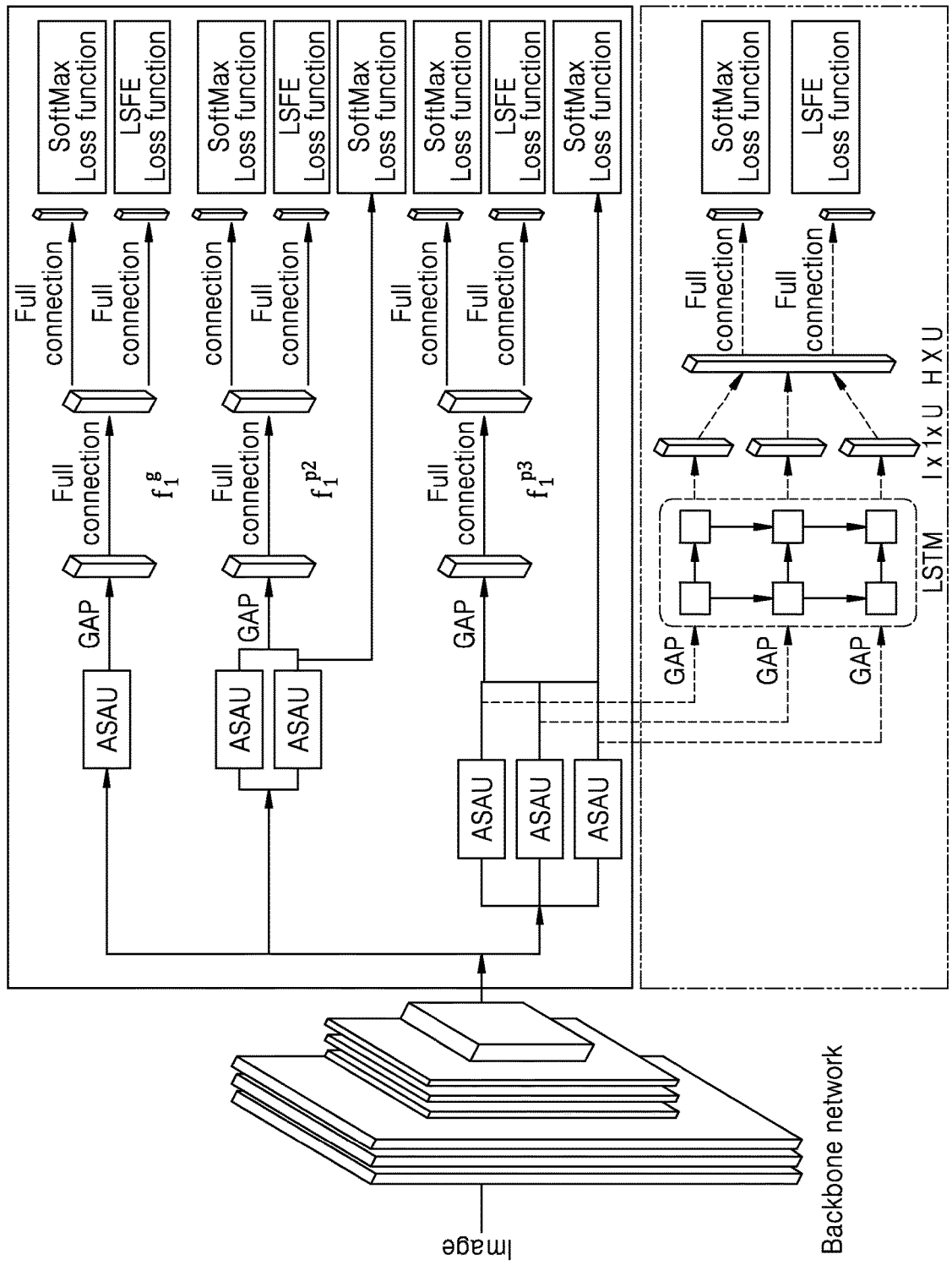
FIG. 14B is a diagram illustrating an example offline training process according to an embodiment of the disclosure.

FIG. 14B is a diagram illustrating an example offline training process according to an embodiment of the disclosure.

Referring to FIG. 14B, the MGMN and the SCAN may be contained at the same time. Wherein, independent ASAUs may be deployed in MGMN and SCAN, respectively, or an ASAU may be shared.

For each branch in the MGMN, the output results of respective ASAUs in the branch are fused (e.g., spliced), and the network is optimized according to the obtained feature information and respective target loss functions. The target loss function may include: a SoftMax loss function, a Lifted Structured Feature Embedding (LSFE) loss function and a Euclidean loss function.

For the SoftMax loss function and the LSFE loss function, the global average pooling (GAP) operation may be performed on the feature information obtained after the fusion, and the sizes of the feature information of respective branches obtained by pooling are 1*512, 2*512, and 3*512, respectively.

The obtained feature information is fully connected through the full connection layer to obtain the corresponding feature information. As shown in FIG. 14B, the feature information corresponding to respective branches are $f_1^g$, $f_1^{p2}$, $f_1^{p3}$ respectively, and their sizes are 1*256, 1*256, and 1*512, respectively.

For respective feature information in the above $f_1^g$, $f_1^{p2}$, $f_1^{p3}$, the full connection operation may be firstly performed for two times respectively, to obtain feature information in different dimensions, for example, a feature map with a size of 1*N may be obtained, wherein N may be the number of object categories contained in the database, and a feature map with a size of 1*512 may also be obtained.

When the network is optimized according to the obtained feature map with a size of 1*N and the SoftMax loss function, the feature map with a size of 1*N is matched with the true value of the corresponding feature information. If consistently matched, the target loss function is minimized, and when not reaching the minimum, the parameter in the network will be adjusted.

When the network is optimized according to the obtained feature map with a size of 1*512 and the LSFE loss function, the feature map with a size of 1*512 is matched with the true value of the corresponding feature information. If consistently matched, the target loss function is minimized, and when not reaching the minimum, the parameter in the network will be adjusted.

For the Euclidean loss function, when the results output by respective ASAUs are fused, the attention maps obtained by respective ASAUs may be fused, and the fused feature information is matched with the true value of the corresponding feature information. If consistently matched, the target loss function is minimized, and when not reaching the minimum, the parameter in the network will be adjusted.

If the SCAN multiplexes the branch containing three ASAUs in the MGMN, the GAP is respectively performed on the results output by respective ASAUs, and the obtained feature information is sequentially input into the LSTM network in an adjusted order, to obtain three pieces of feature information, for example, to obtain three feature maps with a size of 1*1*U. Then the obtained three pieces of feature information are fused (e.g., spliced), to obtain concatenated feature information, for example, to obtain a feature map with a size of H*U. For the obtained feature information, the full connection operation may be performed for two times respectively, to obtain feature information in different dimensions, for example, a feature map with a size of 1*N may be obtained, wherein N may be the number of object categories contained in the database, and a feature map with a size of 1*512 may also be obtained.

When the network is optimized according to the obtained feature map with a size of 1*N and the SoftMax loss function, the feature map with a size of 1*N is matched with the true value of the corresponding feature information. If consistently matched, the target loss function is minimized, and when not reaching the minimum, the parameter in the network will be adjusted.

When the network is optimized according to the obtained feature map with a size of 1*512 and the LSFE loss function, the feature map with a size of 1*512 is matched with the true value of the corresponding feature information. If consistently matched, the target loss function is minimized, and when not reaching the minimum, the parameter in the network will be adjusted.

Referring to FIG. 14B, for an online processing, the above feature information fused by $f_1^g$, $f_1^{p2}$, $f_1^{p3}$ may be feature information finally output by the MGMN. If the SCAN is not configured during the online processing, the feature information finally output by the MGMN is the feature information corresponding to the image, and the feature information is used for image searching.

Referring to FIG. 14B, the upper solid-line frame portion represents the MGMN, and the lower dotted-line frame portion represents the SCAN. The SCAN may be deployed during the offline training phase for optimizing network for the MGMN, but in the online processing phase, only the MGMN may be deployed without deploying the SCAN.

In order to learn more distinctive features, the SoftMax loss function is used for classification during offline training and the LSFE loss function is used for metric learning. In addition, a Part Partition Loss (PPL) function is designed to extract an area with semantic pattern information.

There have been many methods to show that the semantic description of clothing (such as textures, types, and other clothing information) contributes to clothing searching tasks. In an embodiment, the clothing semantic information is used and a SoftMax loss function is used for each clothing attribute to predict accurate attribute.

In addition, in order to learn the similarity of the appearance of the same clothing, an existing method organizes the training data into a one-to-one form, and there is another method to organize the training data into a form of a triple. However, neither of these two above methods may fully utilize the relationship between the training data and are difficult to perform optimization. Regarding this, the LSFE loss function is used to perform optimization, which enables similar clothing to be as close as possible, and dissimilar clothing to be moved away from each other.

During an image searching, more local information is beneficial to improve the searching performance. An existing method designs a group clustering loss function to organize similar and alike specific components together, and some existing methods use the mean square error function to constrain the Euclidean distance between the predicted attention map and the real attention map, so as to predict the roles of the position distribution of each label point.

In order to enable the ASAU in the MGMN to focus on each area containing specific semantics, a mean square error function, also known as PPL, is also designed. The real attention map in this loss function may be calculated by the existing feature map.

The loss function may be designed as below.

$$L_{ppl} = \sum_{i=1}^{N} \sum_{u=0}^{6} \sum_{v=0}^{6} \left\| S^N(u, v) - \tilde{S}^N(u, v) \right\|_2^2. \qquad \text{Equation 1}$$

Where $L_{ppl}$ is the PPL loss function; N is the number of training data used in each iteration; u and v are the rows and columns of the attention map, respectively; the prediction map $S^N(u, v)$ is the attention map in the ASAU with a size of 7*7. The real map $\tilde{S}^N(u, v)$ may be calculated by first finding the maximum point in the attention map and using 2D Gaussian filtering. It should be noted that the branch containing two ASAUs in the MGMN is optimized by using the PPL, and the two maximum points are found in rows

[0-3] and [4-6], respectively. For a branch containing three ASAUs, the three maximum points are found in rows [0-2], [3-4], and [5,6], respectively.

In an embodiment, the offline training process of the feature representation network includes:

The training of the feature representation network may be performed according to the included training sample, which the training process is consistent with the online process described above, and the feature information extracted for the training sample is output; the extracted feature information is matched with the training sample according to the target loss function (for example, SoftMax function), and when consistently matched, the target loss function is minimized.

In an embodiment, each step of the image searching method may be performed by a server, or may be performed locally at a terminal device; alternatively, some steps may be performed at a server, and some steps may be performed at a terminal device.

According to an Embodiment

1) Not only the global information of the target area of the image is extracted, but also the rich detailed information in different granularity is acquired at the same time. When an image is viewed from different areas, different information will be seen. As a whole, the overall outline information of the object may be obtained, but when it is deep into a certain part, more specific detailed information may be obtained. In order to obtain more feature information in the image, it is necessary to synthesize information in different granularities, and finally, more accurate feature information may be obtained by fusion, thereby improving searching accuracy.

2) The relative positional relationship of different objects in the image is considered and simulated, such that the objects in the image become a tight whole, and the enhanced feature information is more differentiated, thereby achieving better searching result.

The image searching method will be described below in conjunction with an application scenario for clothing searching.

When people see a piece of clothing that is of interest in a real scenario, they may want to search for similar clothing online for purchase or collection, and accordingly, a terminal device is required to provide convenient and accurate clothing searching function. For example, when people see a shirt that is of great interest in a real scenario, the terminal device may be used to take a picture of the shirt, and the clothing searching function may retrieve a picture or product information of the clothing that is consistent/similar to the clothing in the picture taken by the user in a database or an e-commerce website or a search website based on the picture taken by the user. In addition, the terminal device may further provide the user with the function of the clothing recommendation, for example, when the user captures certain clothing in reality, the terminal device uses the clothing searching function to retrieve the consistent or similar clothing, and determines other clothing matched with the clothing preset for the clothing or automatically determined in real time, to provide to the user for reference.

Figure 16A:
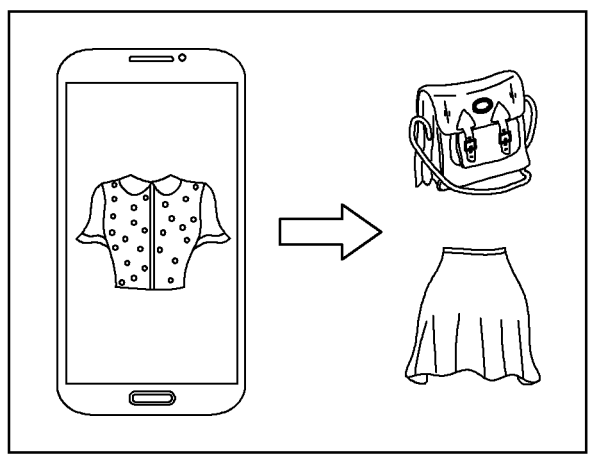
FIG. 16A is a diagram illustrating an example result of clothing image searching according to an embodiment of the disclosure.

FIG. 16A is a diagram illustrating an example result of clothing image searching according to an embodiment of the disclosure.

Referring to FIG. 16A, for example, the user takes a picture of a shirt, and the terminal device provides the user with pictures of a bag and a skirt matched with the shirt.

In an embodiment, when the user uses the terminal device, the picture of the clothing of interest is captured in real time by the camera. The terminal device provides an entry for the searching function on the interface. If the user clicks on the entry, which indicates that the user wants to search for the clothing in the picture, the terminal device uploads the picture captured by the user to a cloud server.

The process of performing the clothing searching may include the steps of feature extraction and searching mentioned in the above embodiments.

Figure 16B:
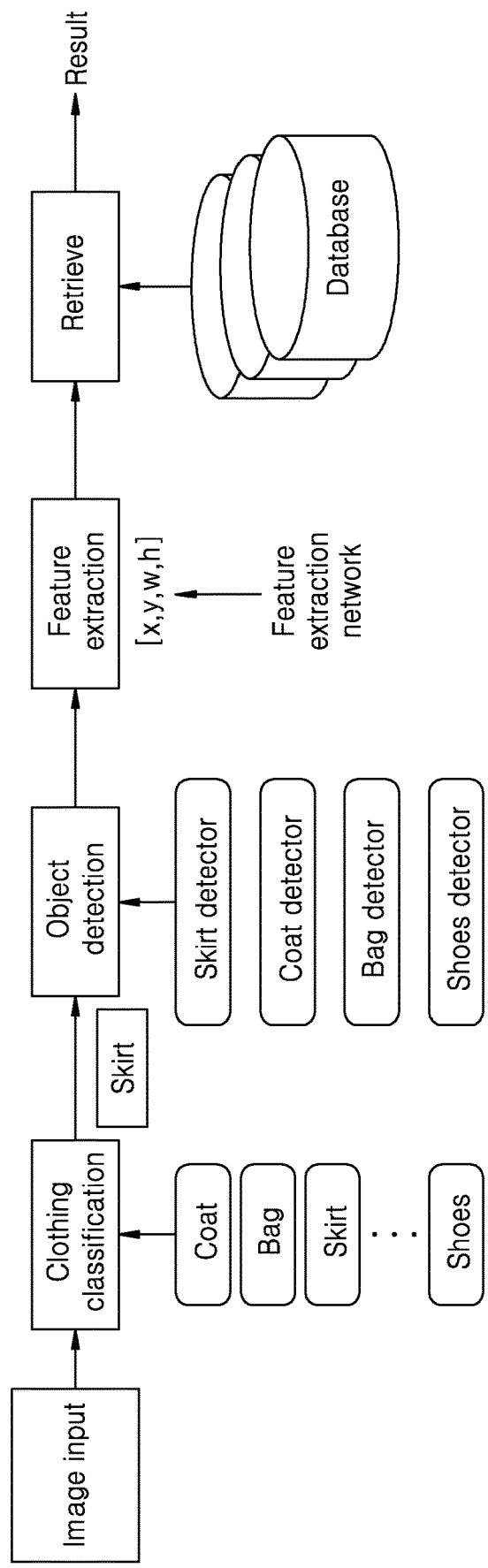
FIG. 16B is a diagram illustrating a clothing searching procedure according to an embodiment of the disclosure.

FIG. 16B is a diagram illustrating a clothing searching procedure according to an embodiment of the disclosure.

Referring to FIG. 16B, in an embodiment, the process of performing the clothing searching may include steps of clothing classification, object detection, feature extraction, and searching. The implementation of the respective steps is described in detail below:

Clothing classification may be performed on a query image input by a user, and the clothing classification may be performed by a cloud server, but is not limited thereto.

The query image may be an image acquired in real time by the user using the terminal device (for example, a clothing image collected by the image collection device in real time), or the user may also use a saved image (for example, an image stored in the terminal device, an image downloaded from the Internet, etc.).

When the user uses the terminal device, an image of clothing of interest may be captured in real time through the camera, and the terminal device provides an entry for the searching function on a user interface. If the user clicks on the entry to search for clothing in an image, the terminal device may upload the image captured by the user to a cloud server.

First, a classification algorithm may be used to classify the clothing in the image, to obtain a category of the clothing in the image to which it belongs. The clothing category may include a top, a bag, pants, a skirt, shoes and the like, but is not limited thereto. Wherein, Googlenet, VGGnet and other classification algorithms may be used to perform the clothing classification on the query images input by the user.

According to the above classification algorithms, it may be possible to obtain a category to which the clothing in the query image belongs, for example, a skirt. When there are multiple articles of clothing in the image, multiple clothing categories may also be obtained.

Based on the obtained clothing category, a specific position corresponding to the clothing in the image may be further determined, that is, object detection may be performed. The object detection may be performed by the cloud server, but is not limited thereto.

Various object detectors may exist according to clothing categories. For example, the object detector may include a top detector, a bag detector, a pants detector, a skirt detector, a shoes detector, and the like, but is not limited thereto.

Based on the obtained category to which the clothing in the image belongs, the detector corresponding to the category may be used for object detection, to obtain a position corresponding to the clothing in the image. The position may characterize a position of the clothing area in the image, such as (x, y, w, h), wherein x and y may be coordinates of the upper left corner of the clothing area (which may also be referred to as a clothing detection frame) in the image, w is the width of the clothing area, and h is the height of the clothing area.

When there are multiple articles of clothing in the image, it may be also possible to perform object detection on the multiple articles of clothing to obtain positions of the respective clothing.

Wherein, the position of the clothing may be automatically detected for the user to select and confirm, or the user may also correct the position where the clothing is automatically detected to obtain more accurate position information; when positions of the multiple clothing is detected, the user may further select the query clothing among the multiple clothing, that is, the clothing to be searched for.

Feature extraction may be performed with respect to the position of the clothing. The feature extraction network may be used for performing the feature extraction on an area of the clothing, and output feature information. Feature information may be expressed as a one-dimensional feature vector. The feature extraction may be performed by the cloud server, but is not limited thereto.

Overall structure of the feature extraction network may include a feature representation network and a backbone network described above. The backbone network may receive a detection result output by the object detection, and obtain area of the clothing in the image according to the position of the clothing. The feature representation network may map a feature map outputted by the backbone network into a fixed-length feature vector, and a 512-dimensional or 1024-dimensional feature vector may be finally obtained. The feature vector generally has higher layer semantic information and is more capable of representing the features of the clothing.

When feature information of the query clothing image is extracted, the extracted feature information may be matched with feature information of clothing images in the clothing database, and a clothing image that matches with the query clothing image may be found in the clothing database. The searching may be performed by the cloud server, but is not limited thereto.

The matched clothing image and relevant information may be provided to the user, and the relevant information may include a URL link information of the clothing, a matched clothing image, etc. The provision may be performed by the terminal device, but is not limited thereto.

1) The feature representation network of a two-layer structure may not distinguish a background and an object in the query image by the calculation method of averaging of feature matrices. When information of the background resulting is considered to calculate a final feature vector (that is, background confusion occurs), features of the query image may not be accurately extracted or not described. However, according to an embodiment, background confusion may be reduced.

In an embodiment, the processing is performed by using at least one ASAU, and the feature information of the main target area may be extracted by using the convolution processing, and the disordered interference area, such as a background area, is filtered out, thereby improving the accuracy of the searching result.

2) The posture or the angle of view of the wearer may cause changes to the shape of the clothing, which has a great influence on the performance of the searching result.

According to an embodiment, even when the shape of the clothing changes greatly, the local features are relatively stable. For example, even when the shape of the clothing changes, the position and style of the button are not changed much, or the style of the collar is not changed much, and when these local features is used to represent the clothing, a more accurate searching result may be obtained.

Therefore, In an embodiment, the feature representation network may be processed by at least two ASAUs, and each ASAU focuses on different areas of the clothing (for example, ASAU 1 mainly focuses on the area where a collar is located, and ASAU 2 mainly focuses on the area where a pocket is located), that is, the feature information of each local clothing area is further extracted, such that a more robust feature may be obtained because the local features are relatively stable and are not affected by the shape change of the clothing greatly, which greatly improving the accuracy of the searching results.

Further, in an embodiment, each ASAU respectively processes based on different scales, and it is possible to obtain feature information of a local area of the clothing that may reflect various detailed information, for example, more specific detailed information such as a collar style or a pocket style in the clothing.

Further, In an embodiment, the feature representation network may be a multi-branch structure, of which each branch contains at least one ASAU, and each branch represents a local area in a different scale, for example, a branch containing a regional processing unit may be considered as the branch focusing on global information of the clothing, and a branch containing two or three ASAUs focuses on detailed information of the clothing, so that more comprehensive feature information may be obtained, and the obtained searching result is more accurate.

3) The feature information output by the feature extraction network may lack spatial constraints, and the searching is performed in a database with enormous clothing images, and because there may be only slight differences among many clothing, the accuracy of the searching results will be greatly reduced when relative relationships of various objects in the clothing, that is, spatial constraints, are not considered.

Figure 16C:
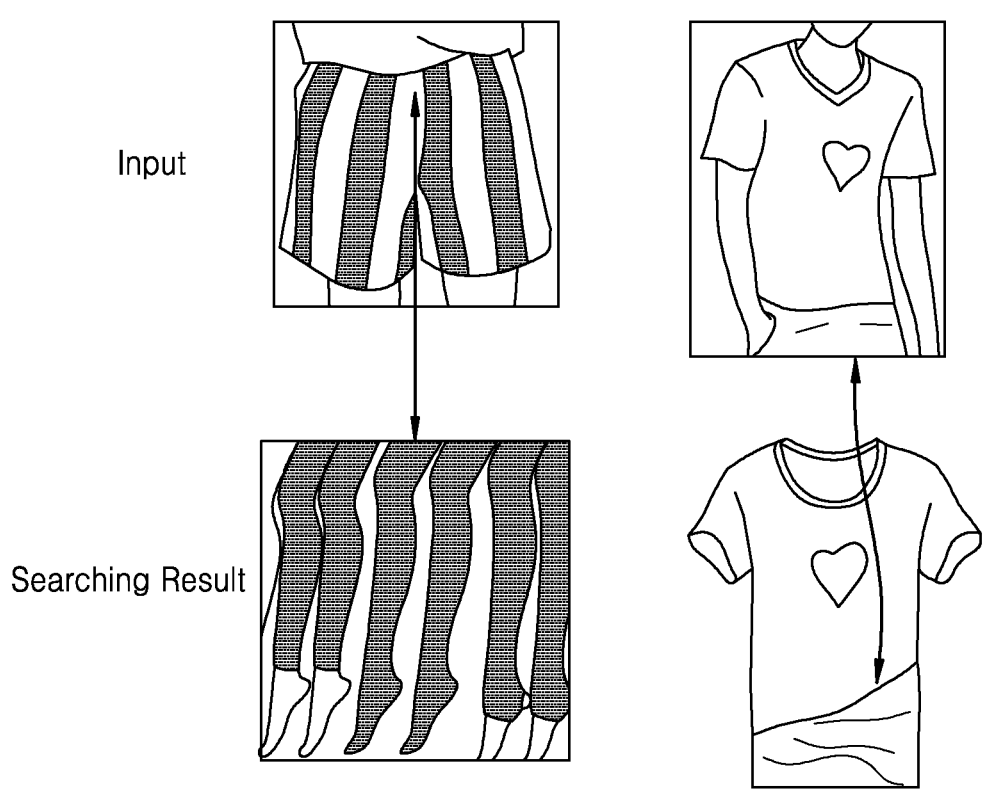
FIG. 16C is a diagram illustrating a clothing searching result without considering a spatial constraint according to an embodiment of the disclosure.

FIG. 16C is a diagram illustrating a clothing searching result without considering a spatial constraint according to an embodiment of the disclosure.

Referring to FIG. 16C, the two images located in the upper of FIG. 16C are images input by the user, and the images contain certain clothing to be searched for. The two upper images may also be referred to as clothing pictures. The two pictures located in the lower of FIG. 16C may be results of image searching without considering the spatial constraints. When the spatial constraints are not considered, the searching result of the short in stripe style may end up with a stocking image which also shows a stripe-pattern. Furthermore, the searching result of a query image including a top (t-shirt) and bottom (pants) may end up with an image of a t-shirt having a boundary. Therefore, when the extracted feature information lacks spatial constraints, the searching result may not be satisfied.

In an embodiment, an adjustment module and an LSTM mechanism are introduced, and the relative positional relationship of different objects of the clothing is considered and simulated. Since clothing may contain several local objects, such as a collar, a button, a sleeve and a pocket, and the like, and these objects may have a natural positional relationship, for example, the collar is located above the pocket and the pocket is located next to the button. The adjustment module may automatically arrange the relative positional relationship of the objects on the clothing. The feature information of different objects may be extracted by multiple ASAUs, and the adjustment module is designed to determine the input order of respective feature information; the LSTM mechanism is used to simulate the relative positional relationship between the areas, and the feature information output by respective ASAUs is jointly enhanced to enhance the spatial constraint, such that the processed respective feature information may reflect the spatial relationship between respective areas, which may greatly improve the clothing searching result.

In general, the utilization of the image searching method to a clothing searching scenario may improve the accuracy of the clothing searching and enable the user to obtain more satisfied clothing information.

The evaluation of the performance improvement in the scenario are given below. The evaluation was performed based on the existing clothing image database, which the database includes three types of clothing, that is a top, a skirt, and pants, wherein the number of images in each type and the number of query images as shown in Table 1.

TABLE 1

|  | Top | Skirt | Pants |
|---|---|---|---|
| Number of query images | 563 | 366 | 289 |
| Number of images in the database | 648153 | 396702 | 372250 |

Table 2 shows the objective evaluation effects of the three methods on the data set, and the searching result may be expressed as a searching accuracy. The three methods are respectively: a first method without using MGMN or SCAN, a second method using MGMN, and a third method using MGMN and SCAN.

As may be seen from Table 2, the searching result of the second method using MGMN is improved by about 2% compared with the first method. This is because, for the feature information of the clothing, the global information may only roughly describe the overall outline information of the clothing, and may weaken or even ignore features of the local information; however, the multiple ASAU branches used in the second method using MGMN may not only extract the global information, but also extract local information with multi-granularity, thereby obtaining a more complete representation of the clothing feature and improving the accuracy of the clothing searching.

Further, it may be seen from Table 2 that the searching result of the third method using MGMN and SCAN is improved by about 2% compared with the second method. This is due to the relative positional relationship of the respective local objects in the clothing, that is, the necessity of the spatial constraint. If the spatial constraints between the objects are not focused, the relationship between the objects is loose, and when performing clothing searching, two similar but not perfectly matched clothes may achieve a high degree of matching, but when adding the relative positional relationships of respective objects, with several objects as a whole, similar but not perfectly matched clothing may be filtered out.

TABLE 2

|  | Top | Skirt | Pants |
|---|---|---|---|
| first method | 454/563 = 80.6% | 310/366 = 84.6% | 212/289 = 73.3% |
| second method | 467/563 = 82.9% | 318/366 = 86.8% | 214/289 = 74.0% |
| third method | 480/563 = 85.2% | 324/366 = 88.5% | 217/289 = 75% |

Figure 16D:
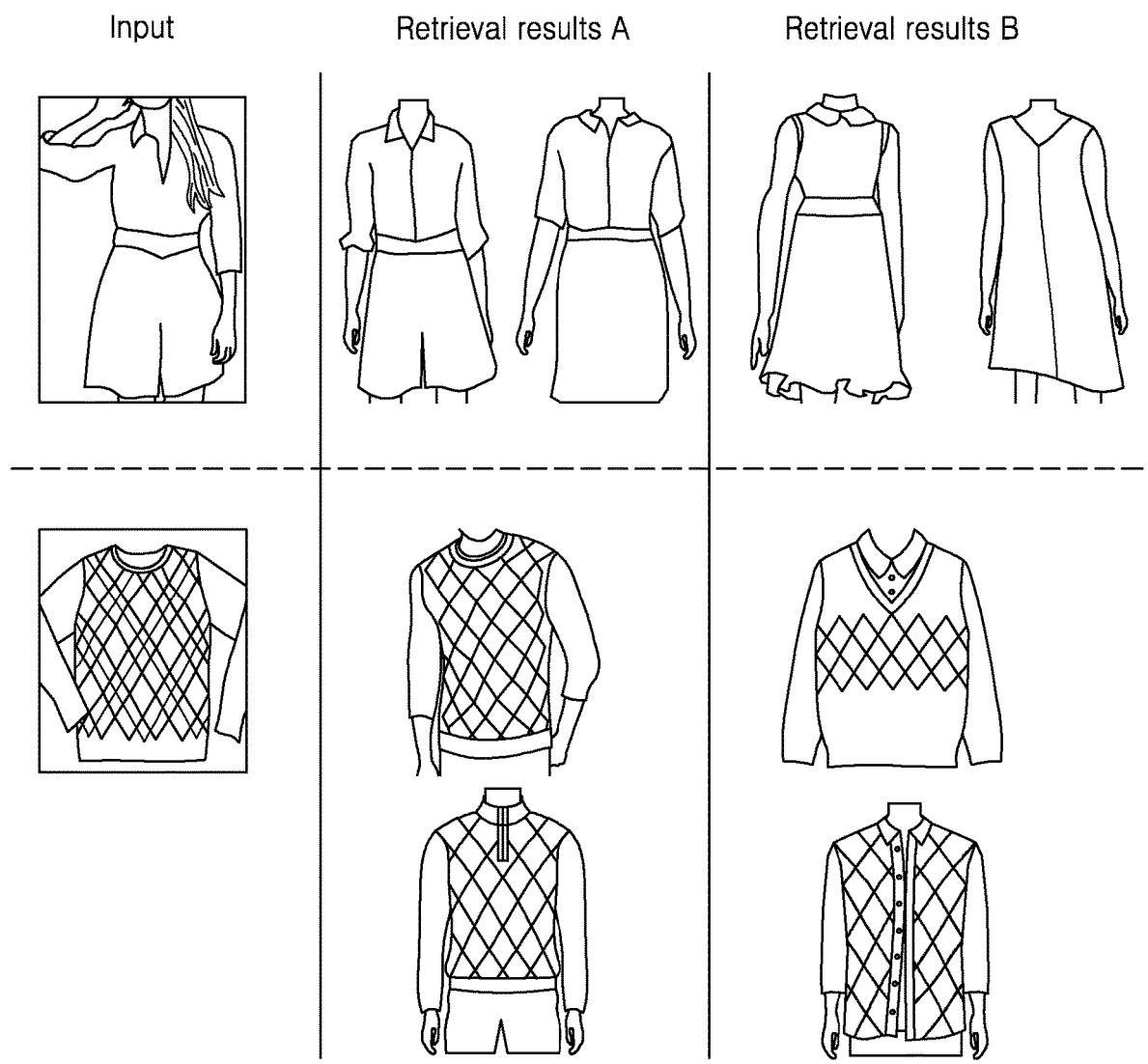
FIG. 16D is a diagram illustrating an example found searching clothing image according to an embodiment of the disclosure.

FIG. 16D is a diagram illustrating an example found searching clothing image according to an embodiment of the disclosure.

Referring to FIG. 16D, which illustrates searching results of the image searching methods described herein. Each picture may return two searching results by inputting a query clothing picture of a long sleeve dress and a diamond-patterned sweater. The third method may allow clothing of the same collar-type and same sleeve-type as a query clothing picture of a long sleeve dress to be retrieved, because more detailed information is considered in the third method. The first method may allow a clothing having similar appearance without a sleeve to the query clothing picture to be retrieved. The third method may allow clothing images highly matched with a query clothing picture of a diamond-patterned sweater to be retrieved, because the dependence relationship of each local object in clothing is considered in the third method.

It should be noted that the above-mentioned clothing searching scenario is only an example, and should not be construed for limitation. Appropriate changes may be made to embodiments herein. For example, features of the pedestrian may be extracted in video, and the feature information of the pedestrian may be obtained, so that the user may search all videos in the database according to the features of the pedestrian in the input video, and finally perform matching calculation, to determine whether the pedestrian's video data exists in the database.

Figure 17:
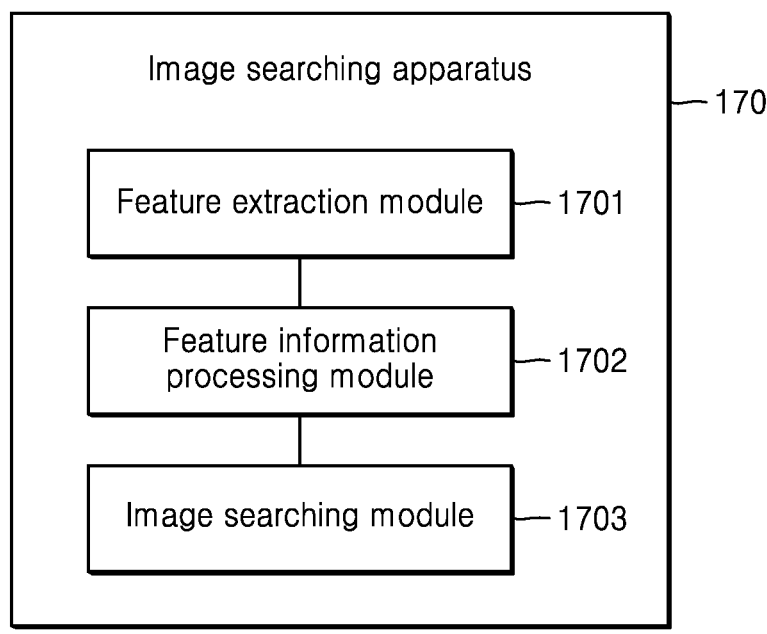
FIG. 17 is a block diagram illustrating an image searching apparatus according to an embodiment of the disclosure.

FIG. 17 is a block diagram illustrating an image searching apparatus according to an embodiment of the disclosure.

Referring to FIG. 17, the image searching apparatus 170 may include: a feature extraction module 1701, a feature information processing module 1702, and an image searching module 1703, wherein, the feature extraction module 1701 is configured to perform feature extraction on the image to obtain first feature information;

the feature information processing module 1702 is configured to perform feature information processing on the first feature information to obtain second feature information corresponding to a target area of the image; and the image searching module 1703 is configured to perform image searching processing on the image according to the second feature information.

In an embodiment, the feature information processing module 1702 may be configured to perform corresponding feature information processing on the first feature information respectively for at least one target area, to obtain third feature information corresponding to respective target areas; perform fusion processing on respective third feature information to obtain the second feature information corresponding to the target area of the image.

In an embodiment, the feature information processing module 1702 may be configured to perform convolution processing on the first feature information based on a first convolution processing parameter corresponding to the target area, to obtain the third feature information corresponding to the target area.

In an embodiment, the feature information processing module 1702 may be configured to perform convolution processing on the first feature information based on the first convolution processing parameter corresponding to the target area; normalize the feature information obtained after the convolution processing; perform a stacking operation on the normalized feature information; perform fusion processing on the feature information after the stacking operation and the first feature information to obtain the third feature information corresponding to the target area.

In an embodiment, the feature information processing module 1702 may be configured to perform convolution processing at least twice on the first feature information based on the first convolution processing parameter corresponding to the target area, to obtain respective fourth feature information corresponding to the target area respectively, wherein first convolution processing parameters used in each convolution processing are different; perform fusion processing according to respective fourth feature information to obtain third feature information corresponding to the target area.

In an embodiment, the feature information processing module 1702 may be configured to perform convolution processing at least twice on the first feature information based on the first convolution processing parameter corresponding to the target area, wherein the first convolution processing parameters used in each convolution processing are different; perform the following processing respectively for the feature information obtained after each convolution processing: normalizing the feature information obtained after the convolution processing, and performing the stacking operation on the normalized feature information, and performing fusion processing on the feature information after the stacking operation and the first feature information to obtain the corresponding fourth feature information.

In an embodiment, the feature information processing module 1702 may be configured to perform convolution processing at least twice on the first feature information based on the first convolution processing parameter corresponding to the target area, wherein the first convolution processing parameters used in each convolution processing are different; normalize the feature information obtained after convolution processing for the feature information obtained after each convolution processing, to obtain corresponding fourth feature information;

and, the feature information processing module 1702 may be configured to perform fusion processing according to respective fourth feature information; perform a stacking operation on the feature information obtained after fusion; perform fusion processing on the feature information after the stacking operation and the first feature information to obtain the third feature information corresponding to the target area.

In an embodiment, the feature information processing module 1702 may be configured to perform fusion processing on the respective fourth feature information based on weights respectively corresponding to the fourth feature information.

In an embodiment, the feature information processing module 1702 may be further configured to perform convolution processing on the first feature information based on the second convolution processing parameter corresponding to the target area; obtain weights respectively corresponding to the fourth feature information according to the result of convolution processing.

In an embodiment, the feature information processing module 1702 may be configured to normalize the result of convolution processing to obtain weights corresponding to the respective fourth feature information.

In an embodiment, the convolution processing parameter includes at least one of the following: a convolution kernel, a convolution kernel size, a dilation factor, and a convolution step size.

In an embodiment, the feature information processing module 1702 may be configured to perform a full connection operation according to respective third feature information to obtain the second feature information corresponding to target area of the image.

In an embodiment, the image corresponds to at least two target area groups, and each target area group contains at least one target area; the feature information processing module 1702 may be configured to perform fusion processing on the third feature information corresponding to respective target areas in each target area group, to obtain fifth feature information corresponding to respective target area groups; perform fusion processing on the respective fifth feature information, to obtain the second feature information corresponding to the target area of the image.

In an embodiment, the feature information processing module 1702 may be configured to perform a full connection operation according to the respective fifth feature information to obtain the second feature information corresponding to the target area of the image.

In an embodiment, the feature information processing module 1702 may be configured to perform a full connection operation according to the respective fifth feature information to obtain the second feature information corresponding to the target area of the image.

In an embodiment, the feature information processing module 1702 may be further configured to input the third feature information corresponding to respective target areas sequentially into a preset LSTM network according to positional relationship of respective target areas, and output relationship-enhanced third feature information.

In an embodiment, the image corresponds to at least two target area groups, and each target area group contains at least one target area; the feature information processing module 1702 may be further configured for at least one target area group, to respectively perform: inputting the third feature information corresponding to respective target areas sequentially into a preset LSTM network according to a positional relationship of respective target areas, and outputting relationship-enhanced third feature information.

In an embodiment, the feature information processing module 1702 may be configured to determine an input order of respective third feature information according to the positional relationship of respective target areas and centroid information of the third feature information respectively corresponding to respective target areas; sequentially input respective third feature information into the preset LSTM network according to the determined input order.

It may be clearly understood by those skilled in the art that the implementation principle and the technical effects of the image searching apparatus are consistent with the foregoing method embodiments, and for convenient and concise description, the parts that are not mentioned in the apparatus embodiment may be referred to the corresponding content in the foregoing method embodiments, which details are not described herein again.

According to an embodiment, an electronic device (for example, a terminal device) may be provided, the electronic device including: a processor and a memory, wherein the memory stores at least one instruction, at least one program, a code set or an instruction set, the at least one instruction, at least one program, the code set or the instruction set is loaded and executed by the processor to implement the corresponding content in the foregoing method embodiments.

Herein, an electronic device may be a smartphone, tablet, speaker, hub, home-hub, router, television, personal digital assistant, media player, portable multimedia player, e-book reader; digital broadcast device, personal computer, laptop computer, micro server, navigation, music player, digital camera, mobile device, vehicle, or the like, but is not limited thereto. The electronic device may be referred to as a device, a terminal, a user device, a user equipment herein.

The electronic device may be a wearable device, for example, a watch, glasses, a band, a head-gear, a headmounted-device, a hair band, a ring, a glove, a bag, or the like, having a communication function and a data processing function, but are not limited thereto. The electronic device may be a sound output device, for example, a pair of earbuds, an earphone, a wireless earphone, a headphone, a headset, a neckband speaker, a speaker, or the like, but is not limited thereto.

In an embodiment, the electronic device may also include a transceiver. The processor is connected to the transceiver, for example, via a bus. It should be noted that, in the actual applications, the number of the transceiver is not limited to one, and the structure of the electronic device does not constitute a limitation on the embodiments.

Wherein, the processor may be a CPU, a general-purpose processor, a DSP, an ASIC, and an FPGA or other programmable logic device, transistor logic device, hardware component, or any combination thereof. It is possible to implement or carry out the various illustrative logical blocks, modules and circuits described in connection with the disclosed herein. The processor may also be a combination for implementing computing functions, such as a combination containing one or more microprocessor, a combination of a DSP and a microprocessor, and the like, but is not limited thereto.

The bus may include a path for transferring information between the above components. The bus may be a peripheral component interconnect (PCI) bus or an extended industry standard architecture (EISA) bus. The bus may be divided into an address bus, a data bus, a control bus, and the like, but is not limited thereto. The memory may be a read only memory (ROM) or other type of static storage device that may store static information and instructions, random access memory (RAM) or other types of dynamic storage device that may store information and instruction, may also be erasable programmable read only memory (EEPROM), compact disc read only memory (CD-ROM) or other optical disc storage, optical disc storage (including compression optical discs, laser discs, optical discs, digital versatile discs, Blu-ray discs, etc.), magnetic disk storage medium or other magnetic storage devices, or any other medium that may be used to carry or store desired program codes in form of instruction or data structure and may be accessed by the computer, which is not limited to these.

According to an embodiment, a computer readable storage medium may be provided. The computer readable storage medium stores computer instructions, which when executed on a computer, enable the computer to execute the corresponding content in the foregoing method embodiments.

It should be understood that although the various steps in the flowchart of the drawings are sequentially displayed as indicated by the arrows, these steps are not necessarily performed in the order indicated by the arrows. Except as explicitly stated herein, the execution of these steps is not strictly limited, and may be performed in other orders. Moreover, at least some of the steps in the flowchart of the drawings may include a plurality of sub-steps or stages, which are not necessarily performed at the same time, but may be executed at different times, and the execution order thereof is not necessarily to be performed sequentially, but may be performed alternately or alternately with at least a portion of the sub-steps or stages of other steps or other steps.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, comprising:
   obtaining first feature information by extracting features from a query image based on a first neural network, wherein the query image corresponds to at least two target area groups, and each target area group comprises at least one target area;
   processing the first feature information based on a second neural network and at least two filters having different sizes for obtaining at least two pieces of third feature information corresponding to the at least two target areas;
   inputting the at least two pieces of third feature information sequentially into a third neural network according to a positional relationship between the at least two target areas to obtain second feature information; and
   identifying an image corresponding to the query image according to the second feature information.

2. The method of claim 1, wherein the at least two pieces of third feature information have different scales.

3. The method of claim 1, further comprising:
   performing a fusion processing on the at least two pieces of third feature information to obtain the second feature information.

4. The method of claim 1, wherein the obtaining of the at least two pieces of third feature information comprises:
   performing a convolution processing on the first feature information based on the second neural network and the at least two filters to obtain the at least two pieces of third feature information corresponding to the at least two target areas.

5. The method of claim 1, wherein the obtaining of the at least two pieces of third feature information comprises:
   performing convolution processing at least twice on the first feature information based on a first convolution processing parameter corresponding to the at least two target areas to obtain a plurality of pieces of fourth feature information respectively corresponding to the at least two target areas respectively, the first convolution processing parameter used in each convolution processing being different; and
   obtaining the at least two pieces of third feature information based on the plurality of pieces of fourth feature information.

6. The method of claim 5, wherein the at least two filters differ in size according to the first convolution processing parameter corresponding to the at least two target areas.

7. The method of claim 5, wherein the first convolution processing parameter comprises at least one of a convolution kernel, a convolution kernel size, a dilation factor, or a convolution step size.

8. The method of claim 5, further comprising:
   performing fusion processing on the plurality of pieces of fourth feature information based on weights respectively corresponding to the plurality of pieces of fourth feature information.

9. The method of claim 8, further comprising:
   performing convolution processing on the first feature information based on a second convolution processing parameter corresponding to the at least two target areas; and
   obtaining weights respectively corresponding to the plurality of pieces of fourth feature information according to a result of the convolution processing based on the second convolution processing parameter.

10. The method of claim 1, further comprising:
determining an input order of the at least two pieces of third feature information according to a positional relationship between the at least two target areas, and
wherein the at least two pieces of third feature information are input into the third neural network according to the determined input order.

11. The method of claim 1,
wherein the first neural network and the second neural network comprises a convolutional neural network (CNN), and
wherein the third neural network comprises a long-short term memory (LSTM) network.

12. An electronic device comprising:
a memory for storing instructions; and
at least one processor configured to execute the instructions stored in the memory to:
   obtain first feature information by extracting features from a query image based on a first neural network, wherein the query image corresponds to at least two target area groups, and each target area group comprises at least one target area,
   process the first feature information based on a second neural network and at least two filters having different sizes to obtain at least two pieces of third feature information corresponding to the at least two target area groups,
   input the at least two pieces of third feature information sequentially into a third neural network according to a positional relationship between the at least two target areas to obtain second feature information, and
   identify an image corresponding to the query image according to the second feature information.

13. The electronic device of claim 12, wherein the at least one processor is further configured to use at least one adaptive spatial attention unit (ASAU).

14. The electronic device of claim 12, wherein the at least one processor is further configured to:
   extract the at least two pieces of third feature information of the at least two target areas by using convolution processing, and
   filter out a disordered interference area from the first feature information to improve accuracy of a search result.

15. A computer program product comprising a non-transitory computer-readable recording medium having recorded thereon a plurality of instructions, which when executed by a computer, instruct the computer to:
   obtain first feature information by extracting features from a query image based on a first neural network, wherein the query image corresponds to at least two target area groups, and each target area group comprises at least one target area,
   process the first feature information based on a second neural network and at least two filters having different sizes to obtain at least two pieces of third feature information corresponding to the at least two target area groups,
   input the at least two pieces of third feature information sequentially into a third neural network according to a positional relationship between the at least two target areas to obtain second feature information, and
   identify an image corresponding to the query image according to the second feature information.

\* \* \* \* \*